(12) United States Patent
Hunt et al.

(10) Patent No.: US 10,898,991 B2
(45) Date of Patent: Jan. 26, 2021

(54) HAMMER UNION SECUREMENT METHODS AND APPARATUS

(71) Applicant: Mountain Valley Supply, LLC, Englewood, CO (US)

(72) Inventors: Bernard P. Hunt, Grand Junction, CO (US); Brett Harris, Cedaredge, CO (US); Thomas Wilson, Englewood, CO (US)

(73) Assignee: Mountain Valley Supply, LLC, Englewood, CO (US)

( * ) Notice: Subject to any disclaimer, the term of this patent is extended or adjusted under 35 U.S.C. 154(b) by 29 days.

(21) Appl. No.: 15/756,361

(22) PCT Filed: Jul. 12, 2016

(86) PCT No.: PCT/US2016/041929
§ 371 (c)(1),
(2) Date: Feb. 28, 2018

(87) PCT Pub. No.: WO2017/039839
PCT Pub. Date: Mar. 9, 2017

(65) Prior Publication Data
US 2018/0250799 A1    Sep. 6, 2018

Related U.S. Application Data

(60) Provisional application No. 62/212,479, filed on Aug. 31, 2015.

(51) Int. Cl.
*B25B 13/50* (2006.01)
*B25B 13/02* (2006.01)
(Continued)

(52) U.S. Cl.
CPC .......... *B25B 13/5008* (2013.01); *B25B 13/02* (2013.01); *B25B 13/48* (2013.01); *B65G 7/00* (2013.01); *B65G 7/12* (2013.01)

(58) Field of Classification Search
CPC ......... B25B 13/02; B25B 13/48; B25B 13/50; B25B 13/5008; B25B 23/0021;
(Continued)

(56) References Cited

U.S. PATENT DOCUMENTS 183,344 A    10/1876  Taber
455,606 A    7/1891   Byrne
(Continued)

FOREIGN PATENT DOCUMENTS

CA    2810346 A1    9/2014
WO    2010083577 A1    7/2010
(Continued)

OTHER PUBLICATIONS

Huwe, The Revolutionary Hammer Union Wrench. (c) 2013-2014. 2 pages.

(Continued)

*Primary Examiner* — Monica S Carter
*Assistant Examiner* — Alberto Saenz
(74) *Attorney, Agent, or Firm* — Santangelo Law Offices, P.C.

(57) ABSTRACT

Techniques for lifting hammer union accessories (17) and securing hammer unions (2). A hammer union accessory (17) may be lifted with the accessory lift portion (11) of the working end (5) of a hammer union securement tool (1). An arcuate surface portion (6) may be configured to mate with a complimentary arcuate surface (7) of a hammer union (2), receive a lug (9) through a hammer union lug opening (8), torque a lug (9) with a lug torque member (10), and secure a hammer union (2).

22 Claims, 14 Drawing Sheets

(51) Int. Cl.
*B25B 13/48* (2006.01)
*B65G 7/00* (2006.01)
*B65G 7/12* (2006.01)

(58) Field of Classification Search
CPC ......... B25B 19/00; B25B 19/161; B65G 7/00; B65G 7/12
USPC ....................................................... 81/57.33
See application file for complete search history.

(56) References Cited

U.S. PATENT DOCUMENTS

| | | | |
|---|---|---|---|
| 579,748 | A | 3/1897 | Haley |
| 804,008 | A | 11/1905 | Hopkins |
| 1,006,348 | A | 10/1911 | Beran |
| 1,207,046 | A | 12/1916 | Howard |
| 1,608,432 | A | 11/1926 | Ryan |
| 1,627,435 | A | 5/1927 | Hooben |
| 1,709,075 | A | 4/1929 | Howard |
| 1,763,353 | A | 6/1930 | Heller |
| 1,945,406 | A | 1/1934 | Adams |
| 2,360,163 | A | 10/1944 | Sadler |
| 2,420,458 | A | 5/1947 | Barker |
| 2,503,364 | A | 4/1950 | Viets |
| 2,539,262 | A | 1/1951 | Moore |
| 2,599,668 | A | 6/1952 | Taylor |
| 2,691,912 | A | 10/1954 | Jones |
| 2,736,954 | A | 3/1956 | Palmer |
| 2,872,888 | A | 2/1959 | Kearney |
| 2,986,054 | A | 5/1961 | Lurie |
| 3,222,958 | A | 12/1965 | Houdesheldt |
| 3,604,106 | A | 9/1971 | Borries |
| 3,769,863 | A | 11/1973 | Griffin |
| 3,929,152 | A | 12/1975 | Graham |
| 4,013,313 | A | 3/1977 | Gardels |
| D271,275 | S | 11/1983 | Richilano |
| 4,483,220 | A | 11/1984 | Shindelar |
| 4,597,123 | A * | 7/1986 | Cobe, Jr. ................ B25C 11/00 7/138 |
| 4,644,600 | A | 2/1987 | Fugate et al. |
| 4,646,378 | A | 3/1987 | Borden |
| 4,713,991 | A | 12/1987 | Gaug |
| 4,715,252 | A | 12/1987 | Pella |
| 4,960,014 | A | 10/1990 | Kelley |
| 5,205,193 | A | 4/1993 | Wield |
| 5,440,956 | A | 8/1995 | Johnstun |
| 5,456,278 | A | 10/1995 | Morris et al. |
| 5,791,704 | A | 8/1998 | Thompson et al. |
| D650,644 | S | 12/2011 | Dosch et al. |
| D650,645 | S | 12/2011 | Dosch et al. |
| D694,078 | S | 11/2013 | Dumaine |
| 9,186,780 | B2 | 11/2015 | Dumaine et al. |
| 2002/0104410 | A1 | 8/2002 | Wang |
| 2004/0025649 | A1 | 2/2004 | Rugee |
| 2004/0055427 | A1 | 3/2004 | Stier |
| 2004/0206213 | A1 | 10/2004 | Hsien |
| 2005/0183550 | A1 | 8/2005 | Day |
| 2005/0217877 | A1 | 10/2005 | Neal et al. |
| 2005/0279193 | A1 | 12/2005 | Darby et al. |
| 2006/0075855 | A1 | 4/2006 | Fitzpatrick |
| 2010/0005934 | A1 | 1/2010 | Guilbault |
| 2010/0050824 | A1 | 3/2010 | Vollenwider |
| 2012/0048069 | A1 | 3/2012 | Powell, Jr. |
| 2014/0138836 | A1 | 9/2014 | Dumaine |
| 2014/0260817 | A1* | 9/2014 | Wilson .................... B25B 13/08 81/60 |
| 2014/0260821 | A1 | 9/2014 | Dumaine |
| 2014/0260822 | A1 | 9/2014 | Dumaine |

FOREIGN PATENT DOCUMENTS

| | | |
|---|---|---|
| WO | 2014138836 A1 | 9/2014 |
| WO | 2017039839 A1 | 3/2017 |

OTHER PUBLICATIONS

U.S. Appl. No. 62/212,479, filed Aug. 31, 2015. First Named Inventor: Bernard P. Hunt.
HUWE Wrench Overview. 2 pages. (c) 2013-2014.
International Patent Application No. PCT/US2016/041929, filed Jul. 12, 2016. First Named Inventor: Bernard P. Hunt.
International Patent Application No. PCT/US2016/041929, filed Jul. 12, 2016. First Named Inventor: Bernard P. Hunt. International Search Report dated Oct. 3, 2016. 4 pages.
International Patent Application No. PCT/US2016/041929, filed Jul. 12, 2016. First Named Inventor: Bernard P. Hunt. Written Opinion of the International Searching Authority dated Oct. 3, 2016. 8 pages.

* cited by examiner

HAMMER UNION SECUREMENT METHODS AND APPARATUS

CROSS REFERENCE TO RELATED APPLICATION

This is the United States National Phase of international PCT Patent Application No. PCT/US2016/041929, filed Jul. 12, 2016 which claims the benefit of and priority to U.S. Provisional Patent Application No. 62/212,479, filed Aug. 31, 2015, both applications and any priority case are hereby incorporated herein by reference in their entirety.

TECHNICAL FIELD

The present inventive technology relates to the field of hammer union securement. The present inventive technology may be used more particularly, but not exclusively, to combine the lifting of hammer union accessories and the securement of hammer unions into consolidated methods and apparatus.

BACKGROUND

Hammer unions are a well-known type of mechanical fastener for connecting items such as the ends of pipe, with widespread use in industries such as oil and gas production. Generally speaking, hammer unions may have a hollow tubular body with a threaded interior into which items having complementary threading, such as the ends of pipe, may be inserted. The exterior of the tubular body may have one or more projections, such as lugs, extending therefrom. In operation, such as to tighten or loosen a connection, the lugs may be struck with a hammer, causing the hammer union to rotate and consequently engaging or disengaging the threads between the hammer union and the pipe ends or other such items, thereby tightening or loosening the connection.

Conventional hammer unions and their use may entail a number of disadvantages. Over time, the repeated striking of lugs with hammers may cause the lugs to fatigue or wear out, making them difficult to work and possibly posing a danger to personnel should they break. The use of a hammer to strike the lugs itself may be an imprecise and inefficient way to apply force to the lug. Moreover, setting up the connections also may involve a substantial amount of strenuous manual labor. For example, in the case of connecting pipe ends, it may take one or more personnel to manually lift the pipe end so that it may be placed into the hammer union before hammering even begins.

The foregoing problems related to conventional hammer unions may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

DISCLOSURE OF THE INVENTIVE TECHNOLOGY

In one embodiment, an object of the inventive technology may be a hammer union securement tool comprising an elongated grip portion, a working end to which said elongated grip portion is joined, an arcuate surface portion of said working end configured to mate to a complimentary arcuate surface of a hammer union, a hammer union lug opening disposed through said arcuate surface portion configured to receive at least one lug of a hammer union, a lug torque member of said hammer union lug opening configured to apply torque to said lug of said hammer union, and an accessory lift portion of said working end configured to lift a hammer union accessory.

In another embodiment, an object of the inventive technology may be the securing of a hammer union comprising the steps of lifting a hammer union accessory with an accessory lift portion of the working end of at least one hammer union securement tool, mating an arcuate surface portion of said working end of said at least one hammer union securement tool to a complimentary arcuate surface of a hammer union, receiving a lug of a hammer union though a hammer union lug opening disposed through said arcuate surface portion of said at least one hammer union securement tool, applying force to an elongated grip portion of said at least one hammer union securement tool to which said working end is joined, torqueing said lug of said hammer union with a lug torque member of said hammer union lug opening by said application of force to said elongated grip portion, and securing said hammer union by said torqueing of said lug of said hammer union.

Naturally, further objects of the inventive technology will become apparent from the description and drawings below.

MODE(S) FOR CARRYING OUT THE INVENTIVE TECHNOLOGY

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
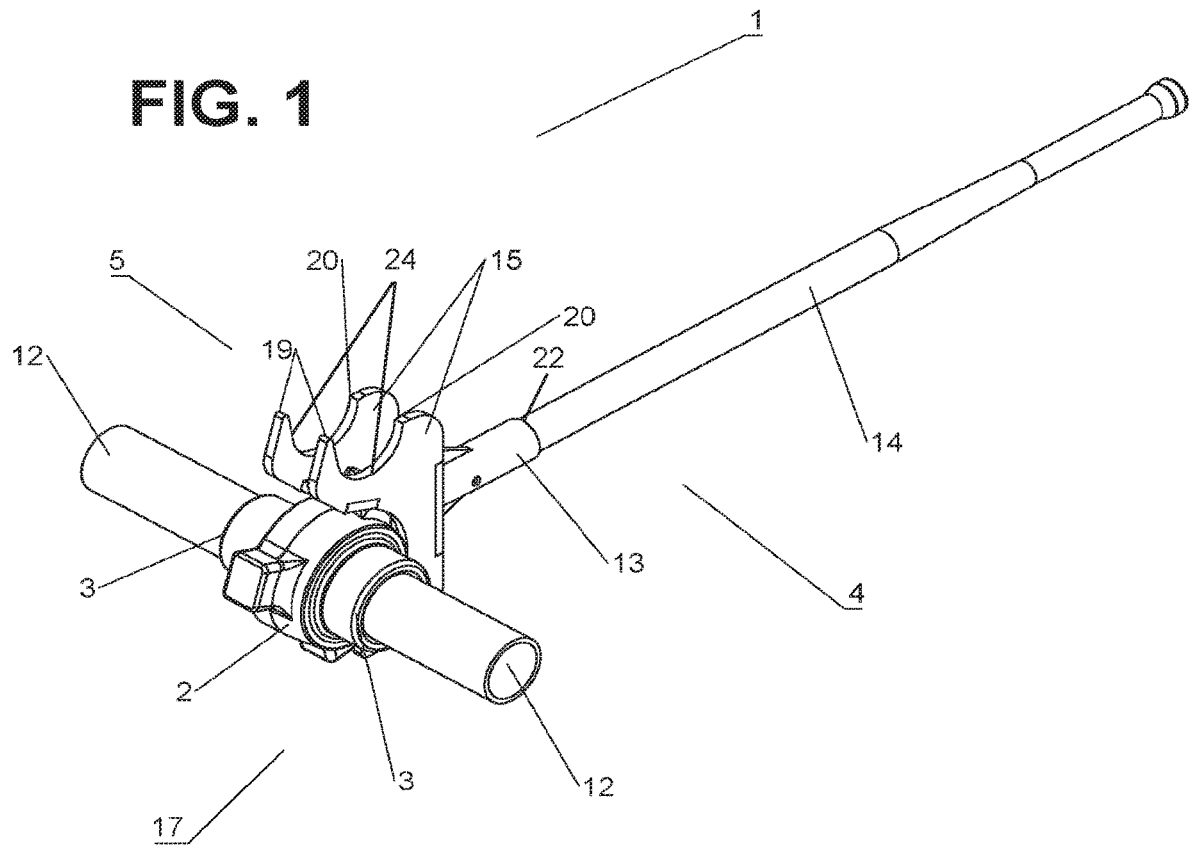
FIG. 1 is a first perspective view of a hammer union securement tool working a hammer union in one exemplary embodiment.
Figure 2:
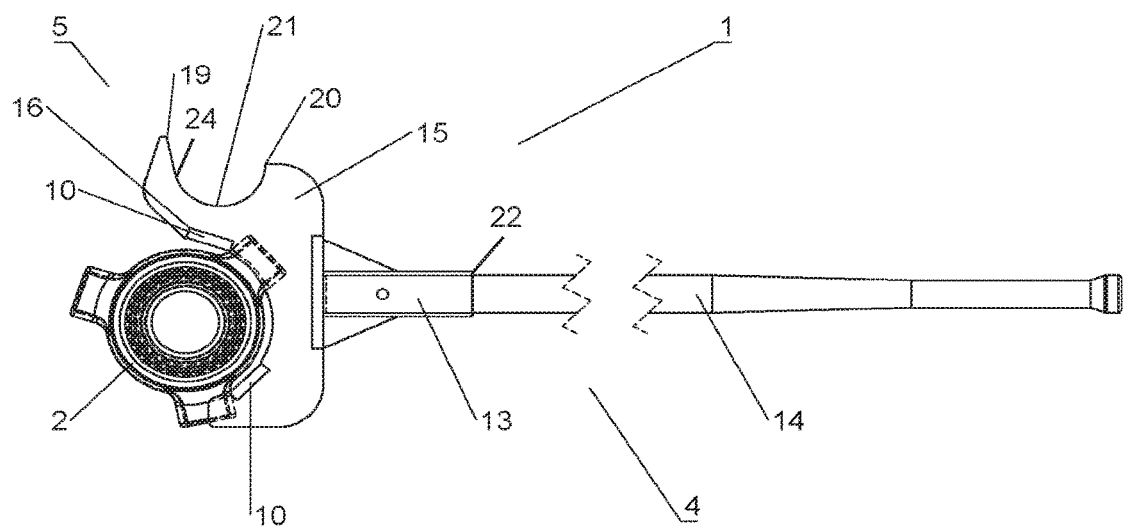
FIG. 2 is a first side view of a hammer union securement tool working a hammer union in one exemplary embodiment.
Figure 3:
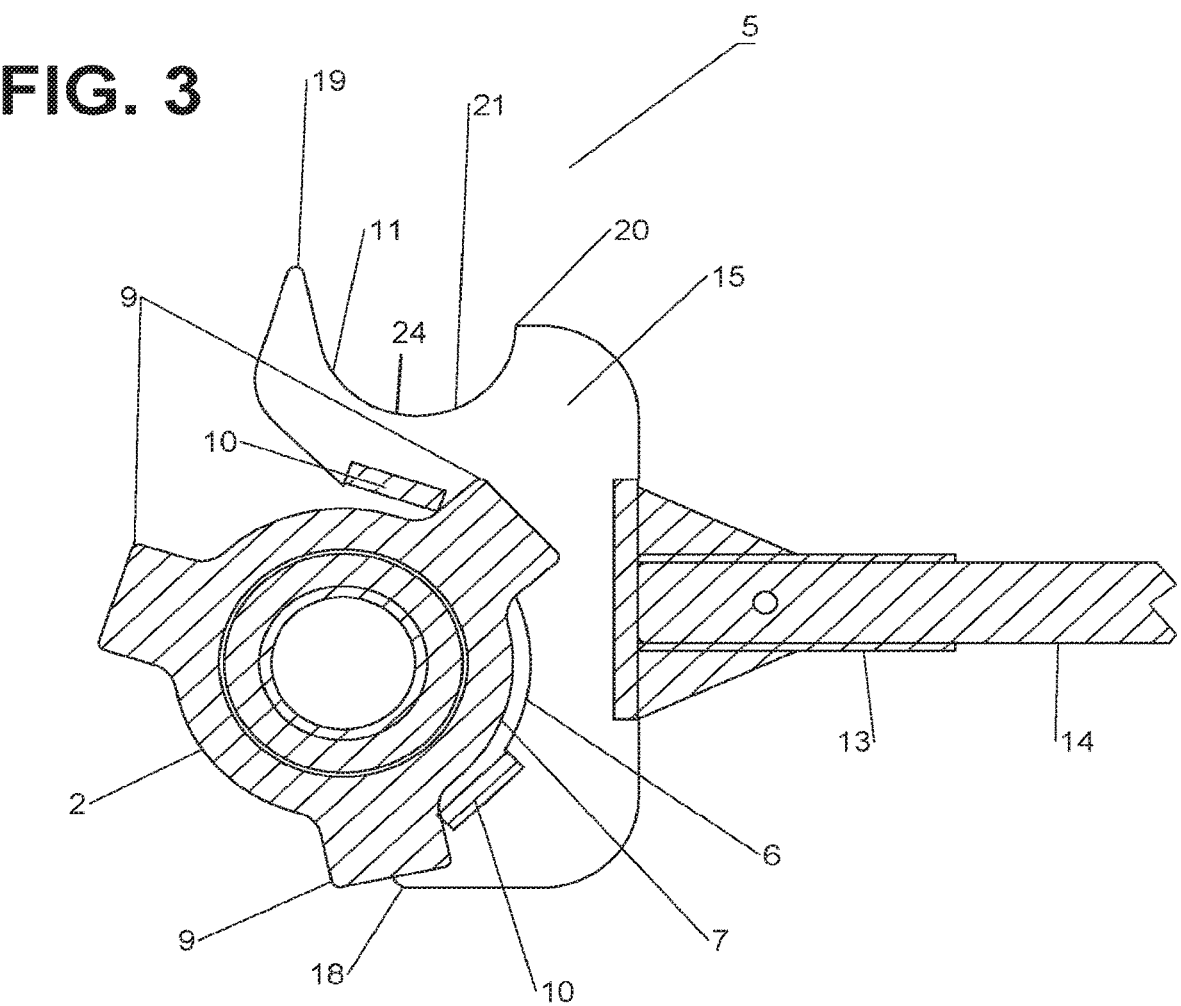
FIG. 3 is a first side view of the working end of a hammer union securement tool working a hammer union in one exemplary embodiment.
Figure 4:
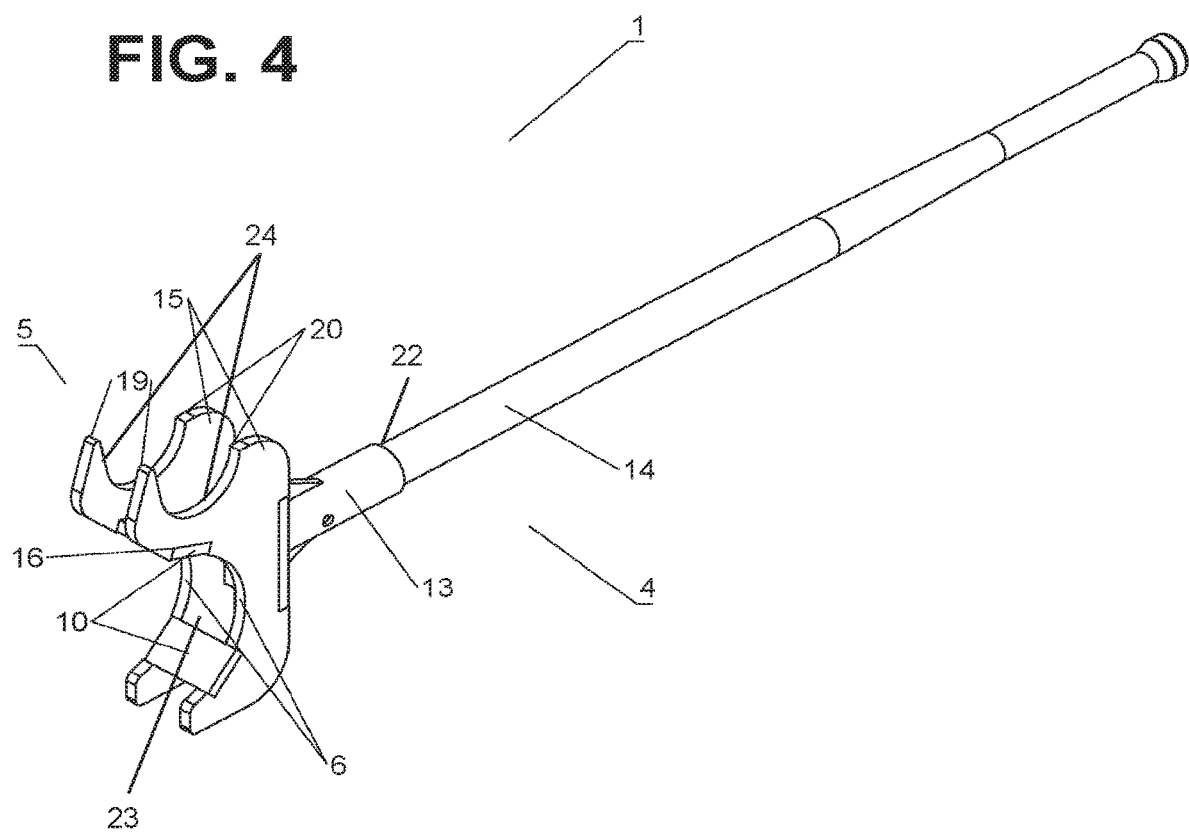
FIG. 4 is a first perspective view of a hammer union securement tool in once exemplary embodiment.
Figure 5:
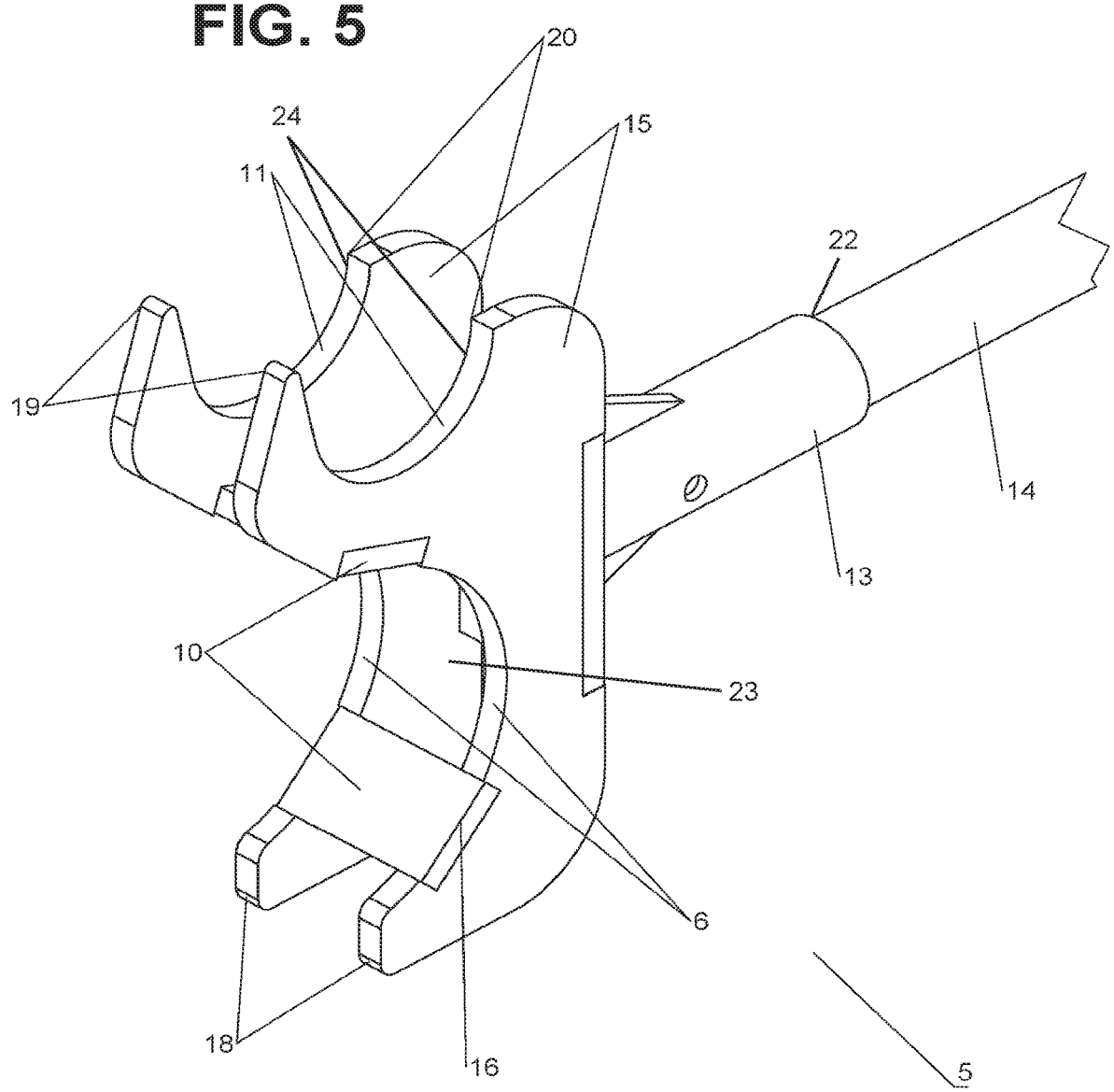
FIG. 5 is a first perspective view of the working end of a hammer union securement tool in one exemplary embodiment.
Figure 6:
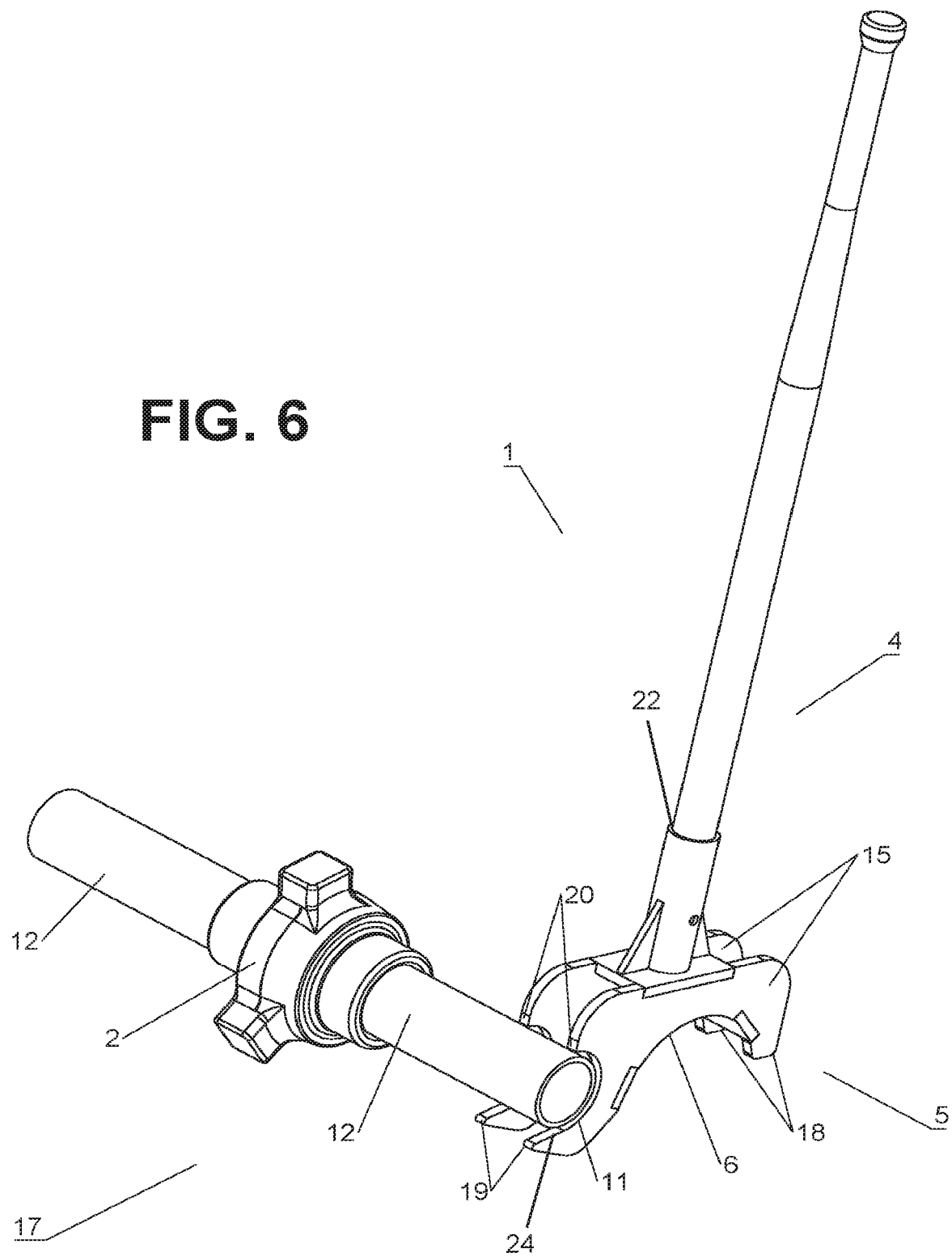
FIG. 6 is a first perspective view of a hammer union securement tool lifting a hammer union accessory in one exemplary embodiment.
Figure 7:
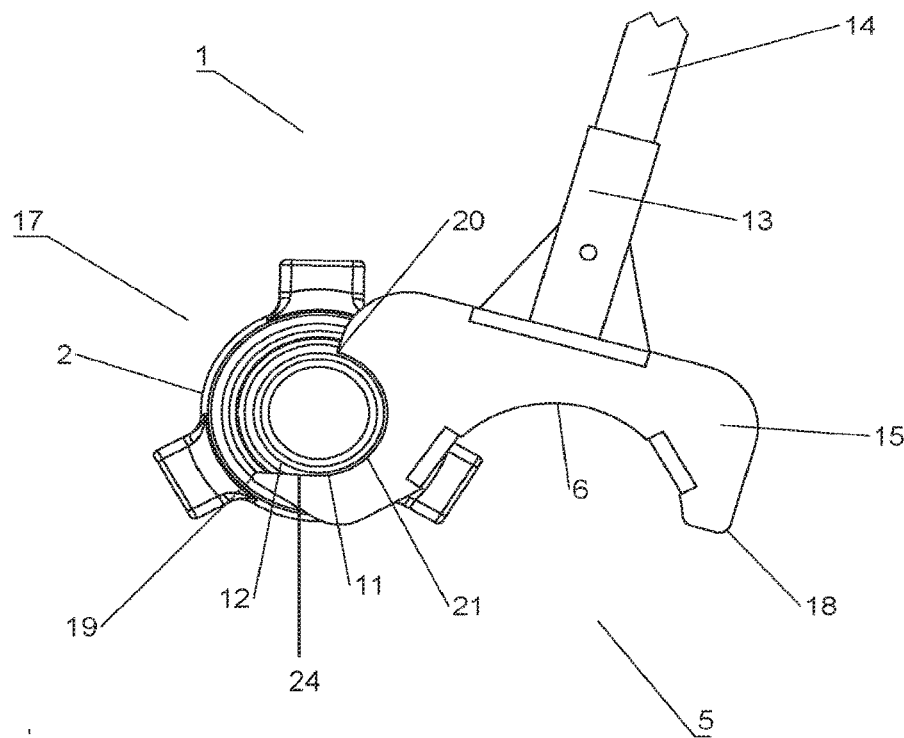
FIG. 7 is a first side view of a pivot lever of a hammer union securement tool in a first position.
Figure 8:
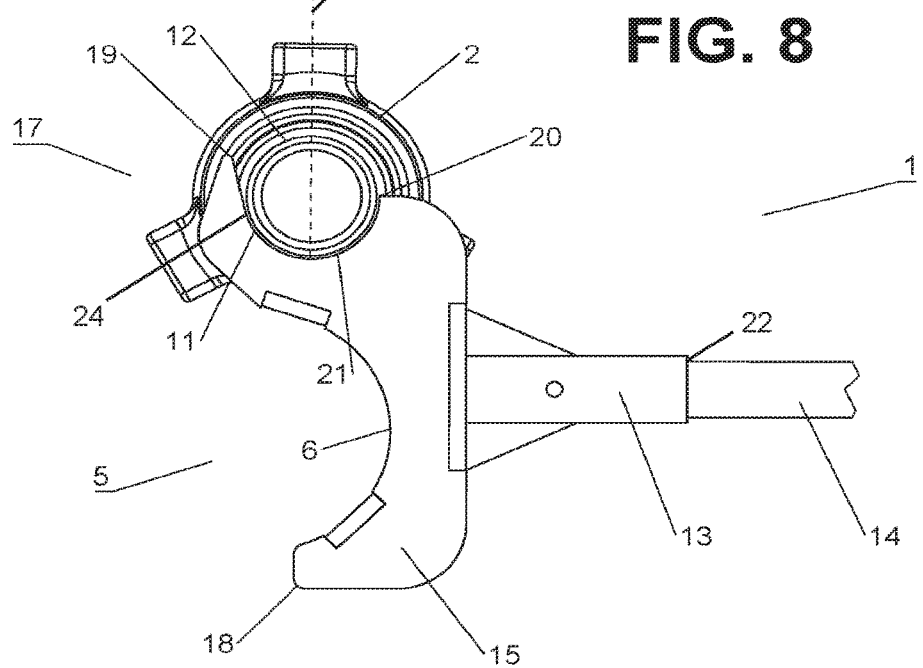
FIG. 8 is a first side view of a pivot lever of a hammer union securement tool in a second position.
Figure 9:
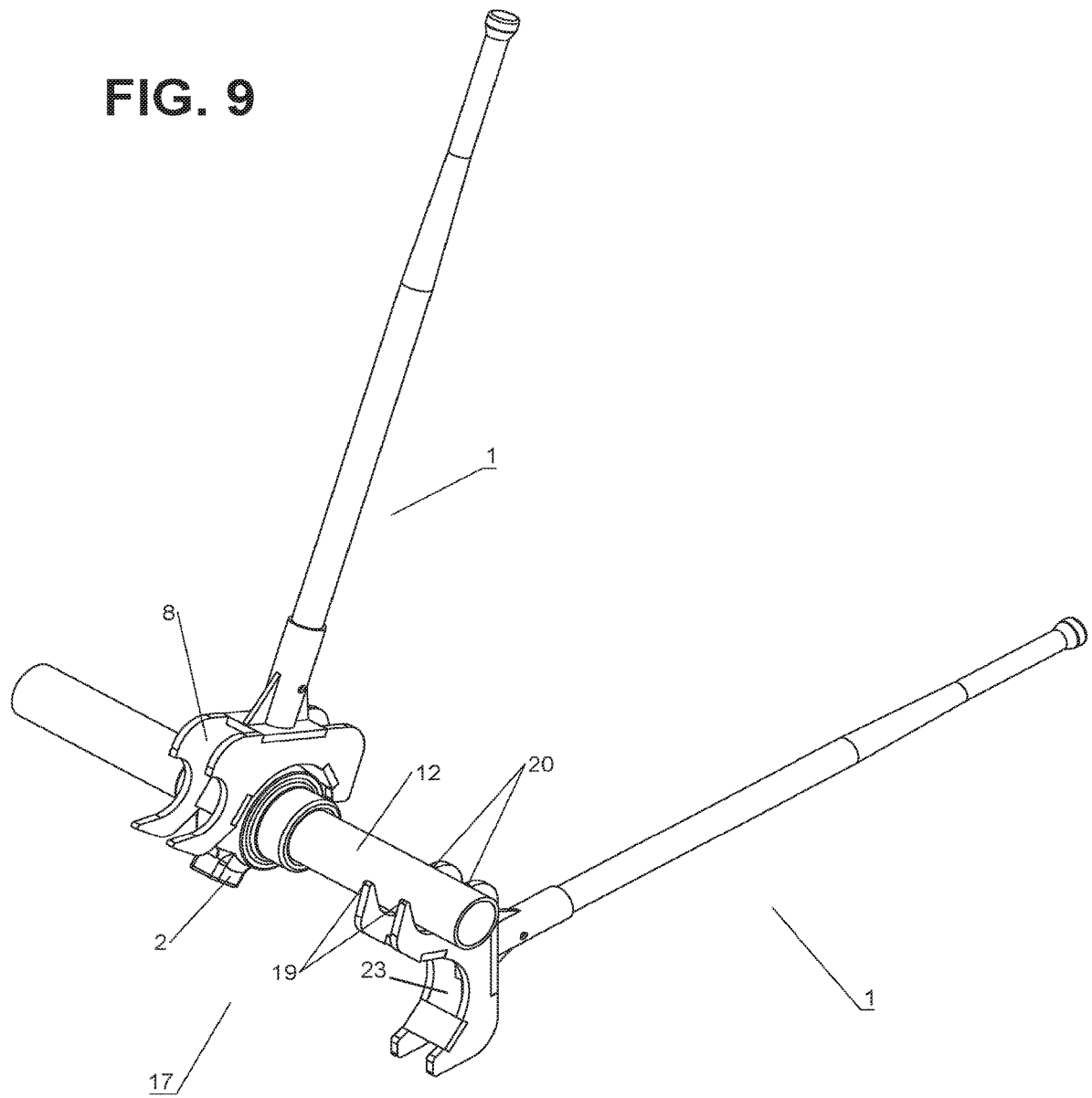
FIG. 9 is a first perspective view of a first hammer union securement tool working a hammer union and a second hammer union securement tool lifting a hammer union accessory in one exemplary embodiment.
Figure 10:
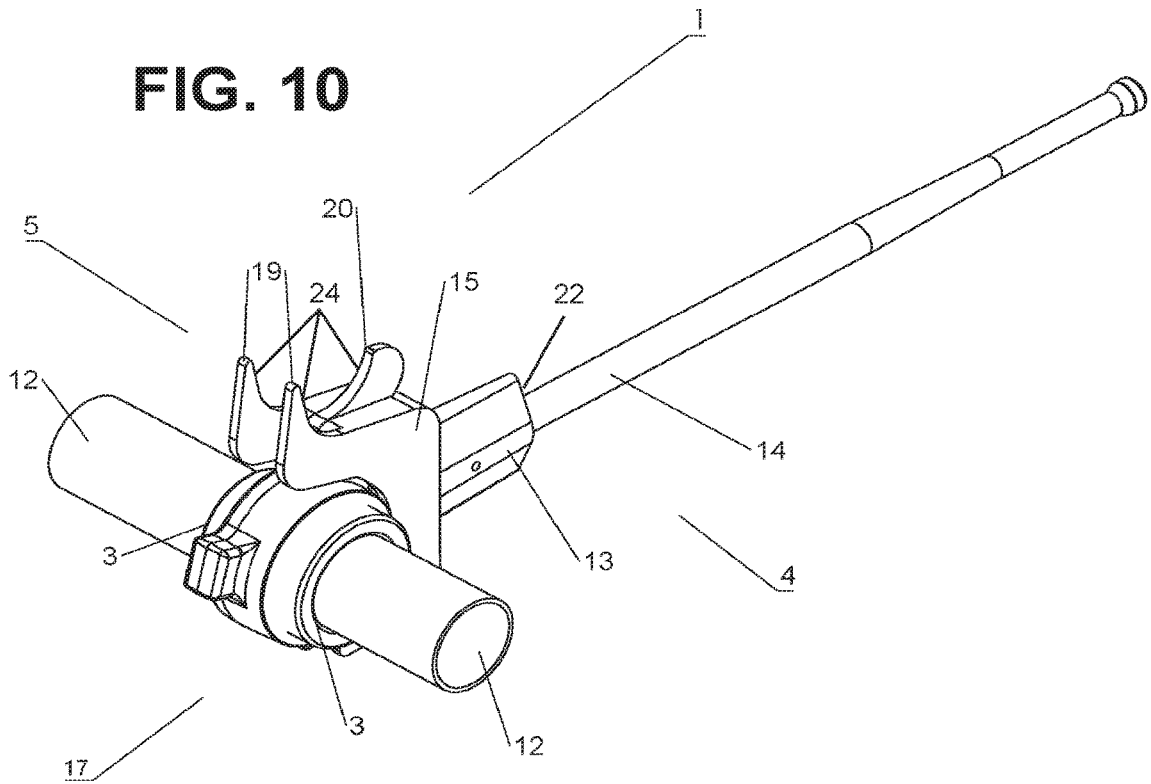
FIG. 10 is a second perspective view of a hammer union securement tool working a hammer union in one exemplary embodiment.
Figure 11:
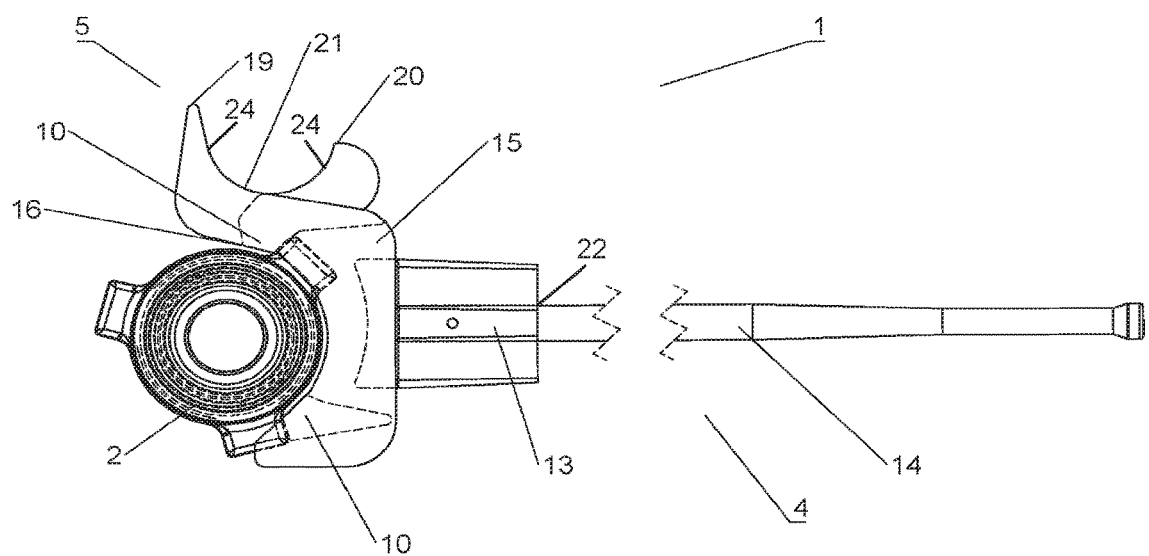
FIG. 11 is a second side view of a hammer union securement tool working a hammer union in one exemplary embodiment.
Figure 12:
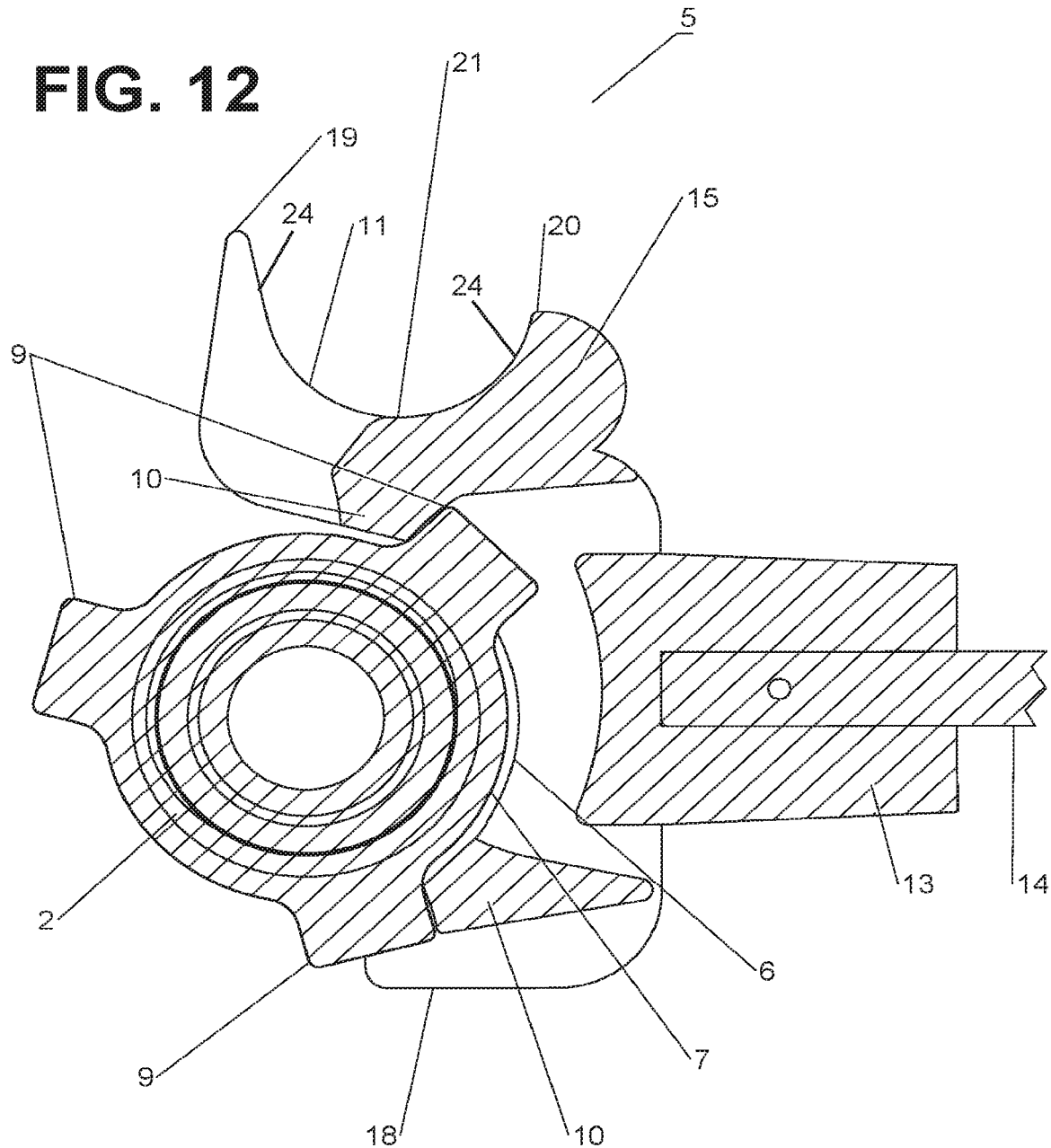
FIG. 12 is a second side view of the working end of a hammer union securement tool working a hammer union in one exemplary embodiment.
Figure 13:
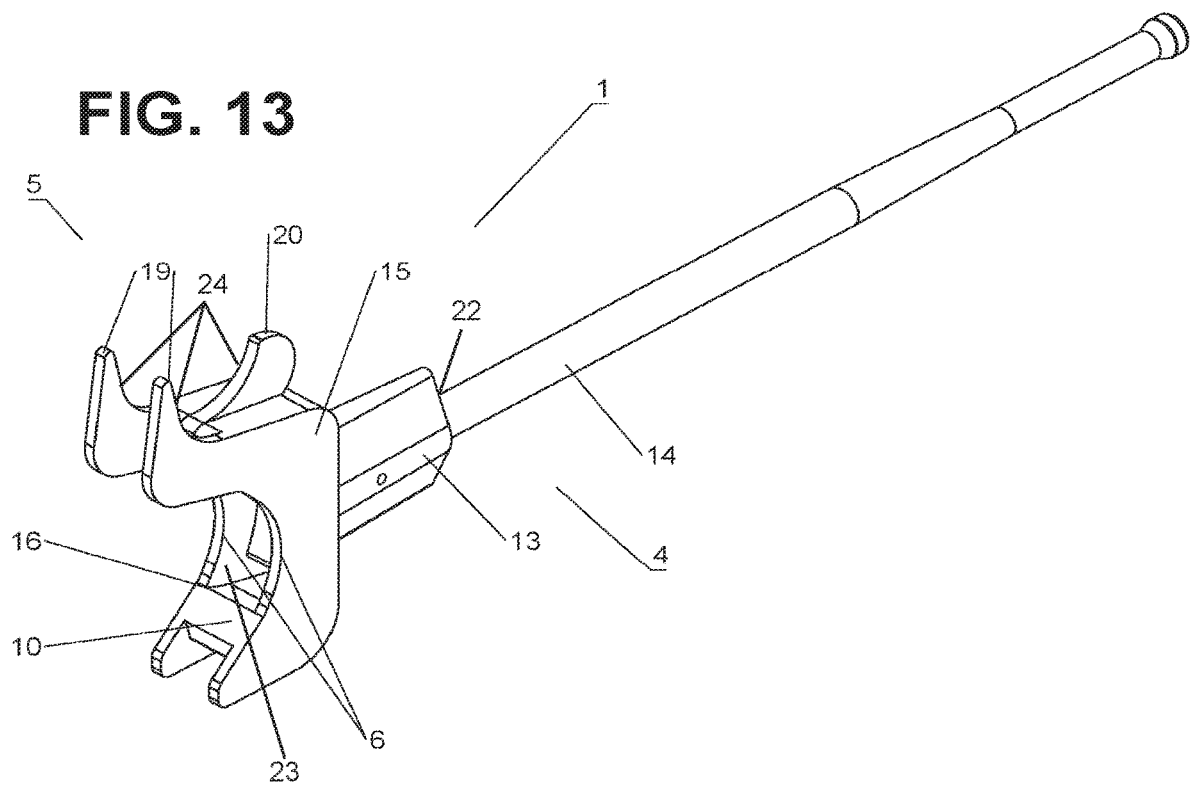
FIG. 13 is a second perspective view of a hammer union securement tool in once exemplary embodiment.
Figure 14:
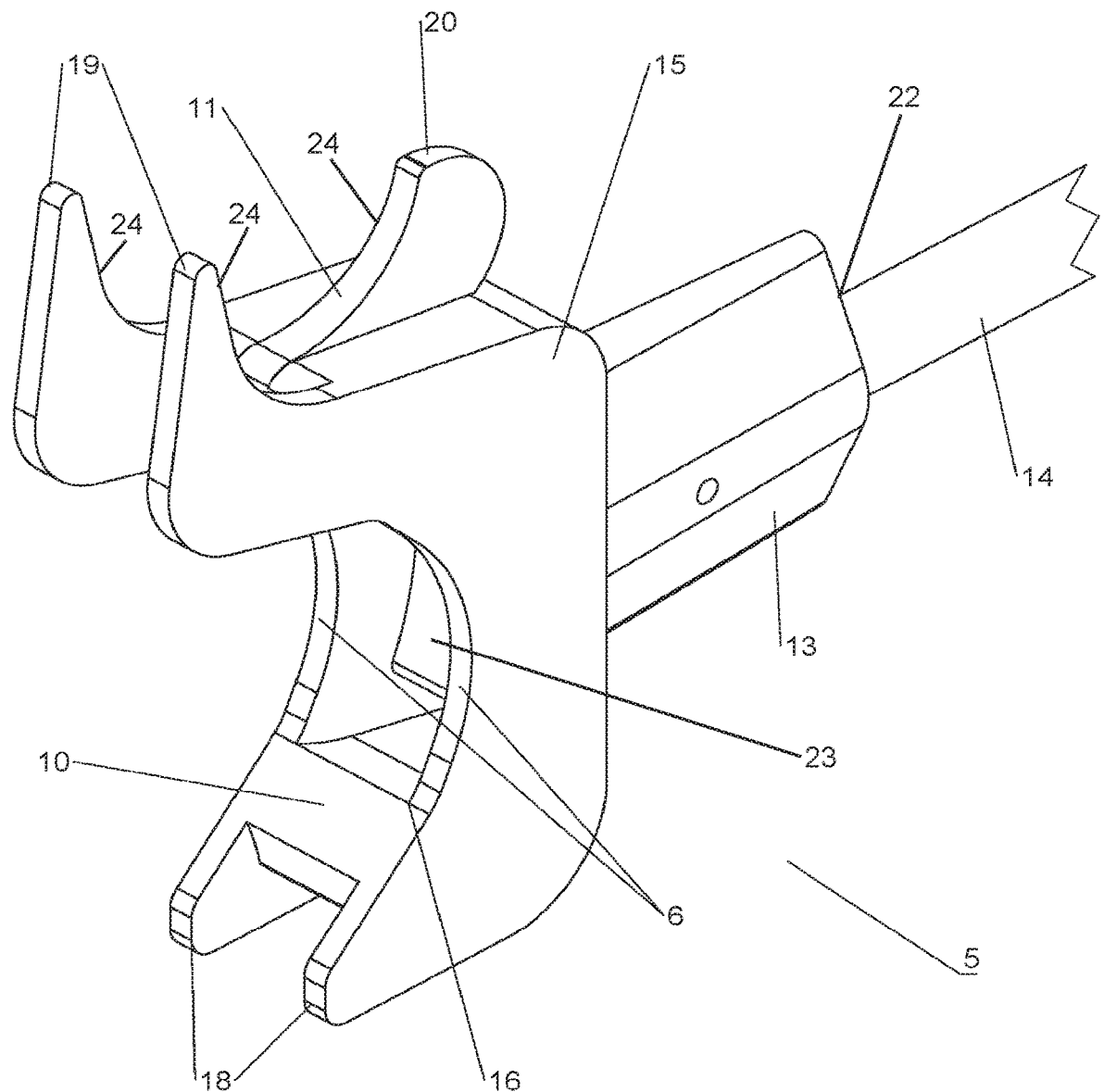
FIG. 14 is a second perspective view of the working end of a hammer union securement tool in one exemplary embodiment.
Figure 15:
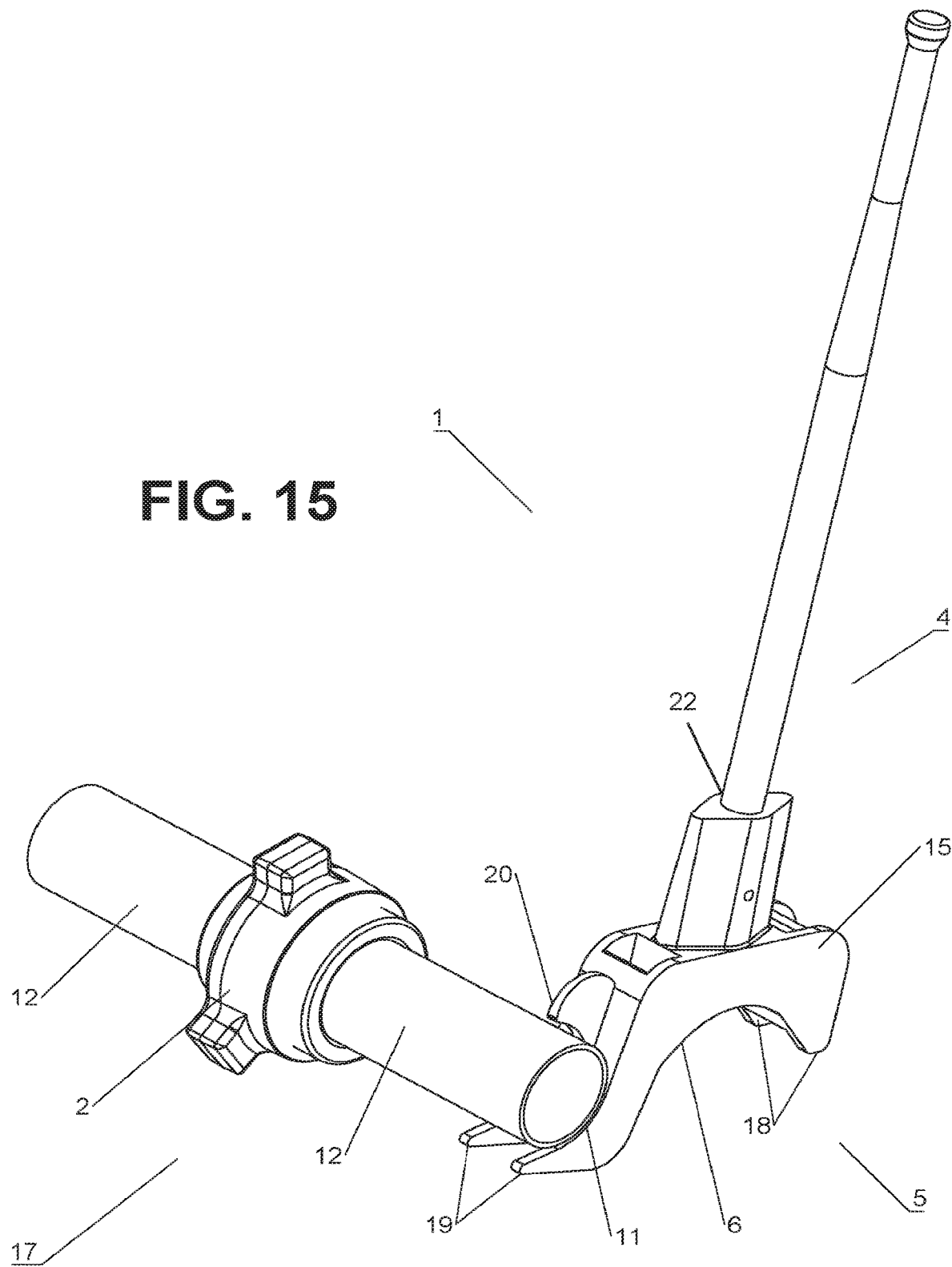
FIG. 15 is a second perspective view of a hammer union securement tool lifting a hammer union accessory in one exemplary embodiment.
Figure 16:
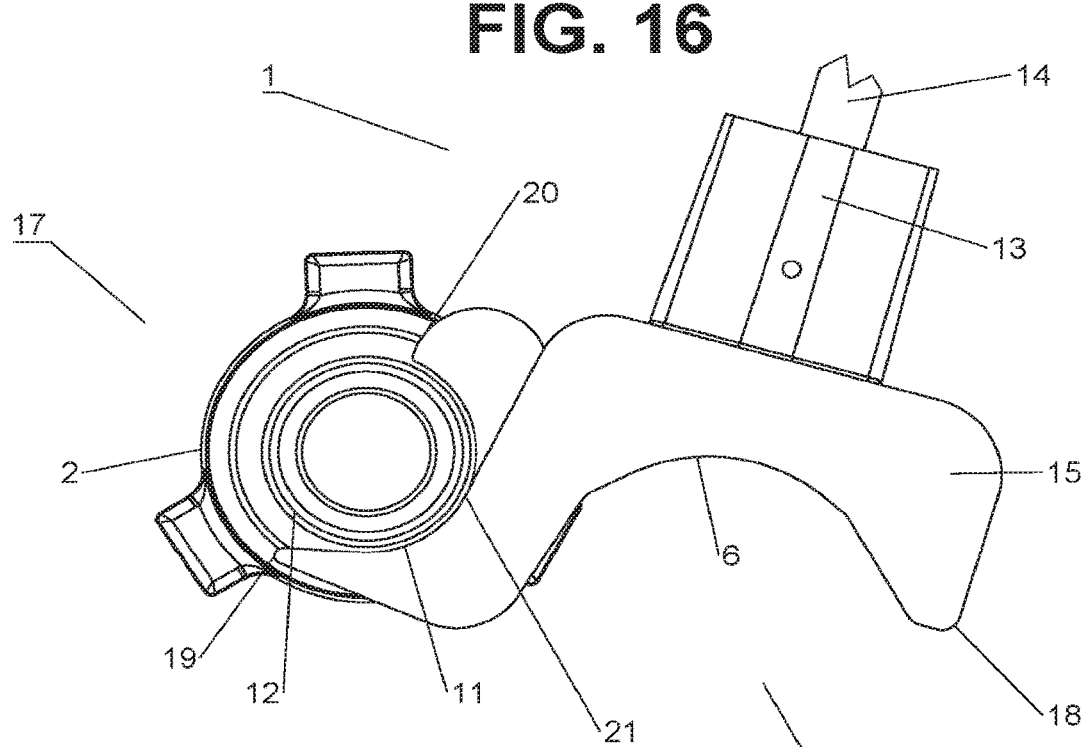
FIG. 16 is a second side view of a pivot lever of a hammer union securement tool in a first position.
Figure 17:
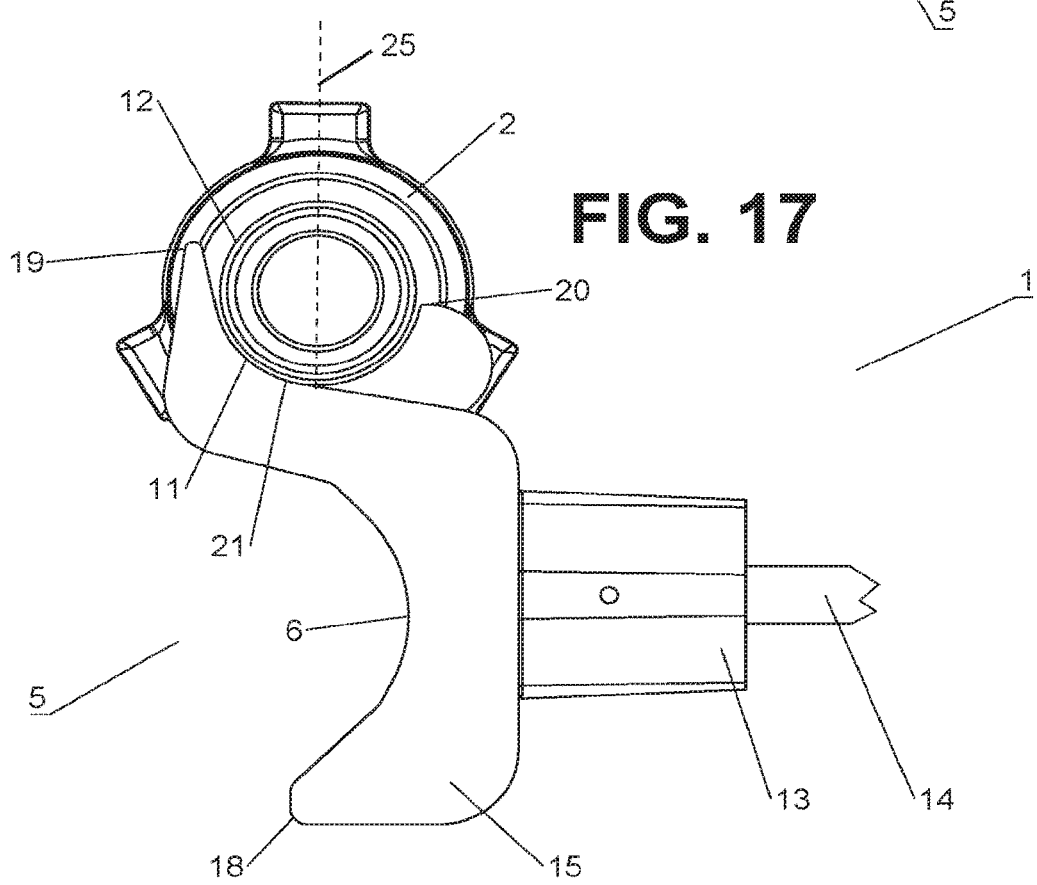
FIG. 17 is a second side view of a pivot lever of a hammer union securement tool in a second position.
Figure 18:
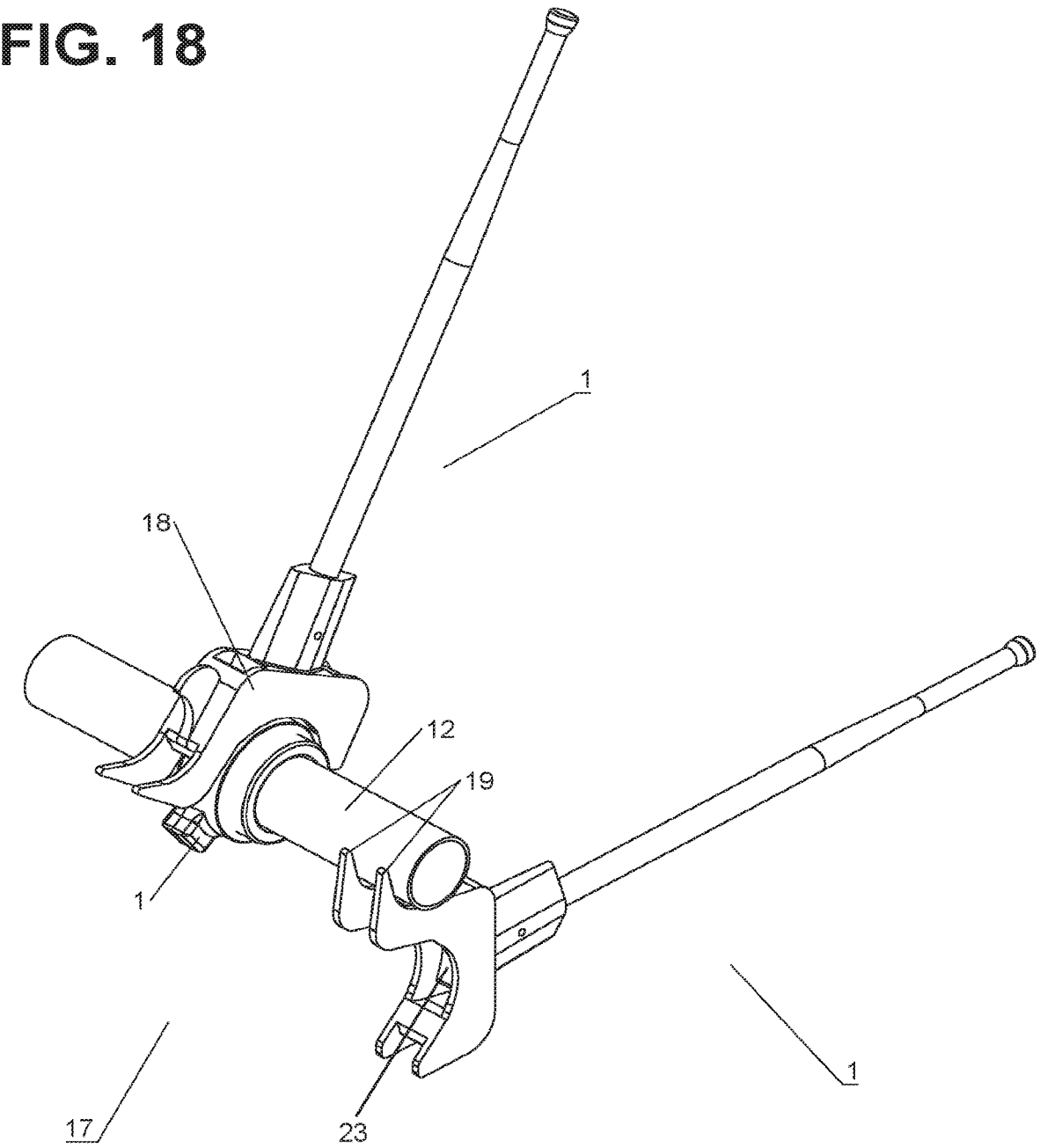
FIG. 18 is a second perspective view of a first hammer union securement tool working a hammer union and a second hammer union securement tool lifting a hammer union accessory in one exemplary embodiment.

FIGS. 1-18 may show a hammer union securement tool (1) and a method for securing a hammer union (2) in exemplary embodiments.

The term "securing" may be understood to include making something firm or fast. In the case of a hammer union (2), this may include rotating the hammer union (2) until items inserted into the hammer union (2), such as pipe ends (3), are securely joined. Naturally, in various embodiments the methods and apparatus disclosed herein also may be employed to achieve the inverse of "securing," such as for a hammer union (2) wherein the hammer union (2) may be rotated to free or decouple joined pipe ends (3).

The term "tool" may be understood to describe the inventive technology as including, in relevant part, an instrument capable of performing the tasks described herein, and in various embodiments may be a hand tool, an implement made part of a machine, or any other modality of working consistent with the inventive principles described herein.

A hammer union securement tool (1) in various embodiments may have an elongated grip portion (4). This may include an area or areas of a hammer union securement tool (1) where an operator may grip the tool so as to handle it, and perhaps so as to apply force to the tool when the tool's working end (5) is engaged. The elongated grip portion (4) should be understood to include embodiments wherein grip involves hand use, grip made part of a machine, or any other modality of grip consistent with the inventive principles discussed herein. Embodiments accordingly may involve applying force to an elongated grip portion (4) of at least one hammer union securement tool (1) to which a working end (5) is joined.

In some embodiments, the elongated grip portion (4) may include a stem part (13) and an extension part (14). The stem part (13) may be relatively shorter than the extension part (14) and may be disposed toward the working end (5) of the tool, perhaps even being joined to the tool. The extension part (14) may be relatively longer than the stem part (13) and may be disposed opposite to the working end (5) of the tool.

The extension part (14) may be made as a removable extension part, which may involve the ability to separate extension part (14) causing elongated grip portion (4) to comprise stem part (13). The removable extension part may be made as a quick release (22) removable extension part, such as with a pin or the like.

The removable extension part may add to the functionality of the tool. For example, with extension part (14) removed, the stem part (13) may shorten the length of the tool, creating a confined working space stem part that permits the tool be used in a confined working space that otherwise might not accommodate the use of extension part (14). Moreover, extension part (14) may be an interchangeable extension part (14), allowing extension parts (14) to have different features to be interchanged onto the tool. For example, extension parts (14) having different lengths may be interchanged onto to the tool, such as to provide various overall lengths of elongated grip portion (4), which in turn may provide for varying amounts of torque when the tool is worked. Extension part (4) accordingly may be seen to include one or more torque maximization length extension parts.

Embodiments accordingly may involve applying force to an extension part (14) of an elongated grip portion (4) having an extension part (14) and a stem part (13). Embodiments also may involve quick-release removing an extension part (14), applying force to a stem part (13) in a confined working space, applying force to an interchanged extension part (14), and applying force along an extension part (14) having a length selected to maximize torque.

A hammer union securement tool (1) in various embodiments may have a working end (5). The working end (5) may include the area or areas of the tool by which the tool's work is performed on a desired object, such as may be more fully described herein. The elongated grip portion (4) may be joined to the tool's working end (5) in any suitable manner consistent with the inventive principles described herein. For example, in some embodiments, a stem part (13) of the elongated grip portion (4) may be welded, cast, molded, or otherwise suitably secured to the working end (5).

In various embodiments, working end (5) may be an interchangeable working end. Working ends (5) may be interchanged to provide the tool's working end (5) with different features, perhaps such as arcuate surface portions (6) having different degrees of arc or hammer union lug openings (8) having different sizes such as to permit the tool to be used with hammer unions (2) of different kinds and configurations, as may be discussed more fully elsewhere herein. Interchangeability of the working end (5) may be accomplished in any suitable manner, including perhaps via the removable extension part elsewhere described, except that it may be the extension part (14) that is retained and the stem part (13), with an alternate working end (5), that may be interchanged. Embodiments accordingly may involve interchanging a working end (5).

In various embodiments, the working end (5) may have two or more spaced-apart plates (15). The spaced-apart plates (15) may be any as consistent with the inventive principles described herein, such as of any size or shape, material, made up of a single piece or multiple pieces, and the like, so long as retaining the configuration of a plate or otherwise performing the functions of the plates as may be described herein. Similarly, the nature of the spacing may be any as consistent with the inventive principles described herein, such as of any size or shape, wholly or partially enclosed, and the like, so long as creating a space between the plates or otherwise performing the functions of the space as may be described herein. Embodiments accordingly may involve the steps of lifting, mating, receiving, applying, torqueing, and securing with the hammer union securement tool (1), as these steps may be described elsewhere herein, utilizing two spaced-apart plates (15) of the working end (5).

Various embodiments may involve two parallel spaced apart plates (15) or two substantially parallel spaced apart plates (15). The plates may be parallel to each other and parallel to the plane through which torque is applied when the tool is worked. Embodiments accordingly may involve utilizing two parallel spaced-apart plates (15) parallel to each other and parallel to the plane through which torque is applied.

The working end (5) in various embodiments may have an arcuate surface portion (6) configured to mate to a complimentary arcuate surface (7) of a hammer union (2). These surfaces may come together to form perhaps a substantially seamless fit, such as to enable, for example, the working end (5) to rest snugly upon the hammer union (2). Naturally, the degree of arc of the arcuate surface portion (6) may be made to be any as necessary to match the hammer union (2) to be worked, and indeed the arcuate surface portion (6) may be made to be of any configuration, perhaps including irregularities in the arc's shape or perhaps even in shapes that are not strictly arcuate or even arcuate at all, to match a surface upon which it is desired to work the tool. Embodiments accordingly may involve mating an arcuate surface portion (6) of the working end (5) of a hammer union securement tool (1) to a complimentary arcuate surface (6) of a hammer union (2).

Various embodiments may involve an arcuate surface portion (6) formed from two parallel spaced-apart plates (15). This may take any suitable configuration of the plates consistent with the inventive principles described herein. For example, each plate may have an arc shape cut out thereon, such that the arc shapes line up when the plates are disposed in a spaced-apart parallel relation. The arcuate surface portion (6) accordingly may encompass the two edges of the arc shapes cut out on each plate, as where the two edges may sit flush against a complimentary arcuate surface (7) of a hammer union (2) when mated thereto. Embodiments accordingly may involve mating an arcuate surface portion (6) formed from two parallel spaced-apart plates (15).

A hammer union lug opening (8) may be disposed through the arcuate surface portion (6) in various embodiments and may be configured to receive at least one lug (9) of a hammer union (2). The opening (8) itself may be made to be of any suitable configuration, including for example of shape, size or depth, to receive the lug (9), such as while enabling arcuate surface portion (6) of the working end (5) to remain mated to complimentary arcuate surface (7) of the hammer union (2). Lug (9) similarly may be received in any suitable manner, such as being received within the opening (8) or perhaps substantially passing through the opening (8). So long as lug (9) is received, the opening (8) may be further configured, such as with supporting walls or coverings to enclose the opening, as may be necessary or desirable. Embodiments accordingly may involve receiving a lug (9) of a hammer union (2) through a hammer union lug opening (8) disposed through an arcuate surface portion (6) of a hammer union securement tool (1).

In various embodiments, hammer union lug opening (8) may be or include some or all of the space (23) between two parallel spaced-apart plates (15). Embodiments accordingly may involve receiving a lug (9) through a space (23) between two parallel spaced-apart plates (15).

The hammer union lug opening (8) in various embodiments may have a lug torque member (10) configured to apply torque to the lug (9). Torque may be created, for example, following the mating of arcuate surface portion (6) and complimentary arcuate surface (7) when force is applied to elongated grip portion (4). The torque may be applied to the lug (9) through contact with lug torque member (10). Lug torque member (10) accordingly may be any structure of working end (5) suitable for applying torque, and in some embodiments may be an edge or other suitable part of hammer union lug opening (8).

Embodiments accordingly may involve torqueing a lug (9) of a hammer union (2) with a lug torque member (10) of a hammer union lug opening (8) by the application of force to elongated grip portion (4), and securing a hammer union (2) by the torqueing of the lug (9).

In various embodiments, a lug torque member (10) may be a spacer (16) between two parallel spaced-apart plates (15). Spacer (16) may be any structural component suitable for spacing apart the plates, including for example a plate, cross bar, or other member, perhaps as may be rigidly fixed to the plates on each end. The spacer (16) accordingly may be seen to be in communication with the space between the plates, such as perhaps being considered to be disposed within such space, or perhaps as forming a leading or trailing edge of such space. In its capacity as a lug torque member (10), the spacer (16) may be in communication with the space such that when a lug (9) is received within hammer union lug opening (8), the spacer (16) is positioned to contact the lug (9) so as to apply torque when the tool is worked. Embodiments accordingly may involve torqueing with a spacer (16) between two parallel spaced-apart plates (15).

In various embodiments, the spacer (16) may strengthen, support, or otherwise reinforce the working end (5) or one or more parts thereof. The spacer (16) accordingly may encompass a reinforcement element, a working end reinforcement element, a lug torque member reinforcement element, an accessory lift portion reinforcement element, a pivot lever reinforcement element, and the like. Embodiments accordingly may involve reinforcing with a spacer (16), reinforcing a working end (5) with a spacer (16), reinforcing a lug torque member (10) with a spacer (16), reinforcing an accessory lift portion (11) with a spacer (16), and reinforcing a pivot lever (18) with a spacer (16).

Working end (5) in various embodiments may have an accessory lift portion (11) configured to lift a hammer union accessory (17). Hammer union accessories (17) may include items in connection with which hammer unions (2) typically are used, such as union pipe (12) to be joined by a hammer union (2), or perhaps items having a similar purpose and functionality, or even simply items commonly found in working environments in which hammer unions (2) are used. The accessory lift portion (11) may be of any type or configuration as may be located on a portion of working end (5) consistent with the inventive principles discussed herein and suited to enable lifting of such items, including for example hooks, clamps, rails, and the like. Embodiments accordingly may involve lifting a hammer union accessory (17) with an accessory lift portion (11) of the working end (5) of at least one hammer union securement tool (1).

In various embodiments, the accessory lift portion (11) may be formed from two parallel spaced-apart plates (15). This may take any suitable configuration of the plates consistent with the inventive principles described herein. For example, the accessory lift portion (11) may include, and in some embodiments may consist of or otherwise be limited to, some or all of two parallel spaced-apart plates (15), while in some embodiments the accessory lift portion (11) may utilize the two parallel spaced-part plates (15), but may utilize other structures or elements as well. In some embodiments, each plate may have a lift shape cut out thereon to enable a lifting capability, such that the shapes line up when the plates are disposed in a spaced-apart parallel relation. The lift accessory portion (11) accordingly may encompass the two edges of the lift shapes cut out on each plate, as where the two edges may engage a hammer union accessory (17) in a manner to enable the accessory to be lifted. Embodiments accordingly may involve lifting with an accessory lift portion (11) formed from two parallel spaced-apart plates (15).

In various embodiments, the accessory lift portion (11) may be separate from the arcuate surface portion (6). This may include occupying a discrete location separated from the arcuate surface portion (6) on working end (5), being configured on working end (5) such that the structure of one of these portions is not utilized in the operation of the other such portion, and the like. Embodiments accordingly may involve lifting with an accessory lift portion (11) separated from an arcuate surface portion (6).

In various embodiments, the accessory lift portion (11) may be or include a hook (24). Such may involve a hook formed from two parallel spaced-apart plates (15), such as wherein a lift shape cut out from each plate, as may be described elsewhere herein, may be the shape of a hook. Naturally, the hook (24) may be any configuration, including of shape, size, material, made up of a single piece or multiple pieces, and the like, consistent with the inventive principles discussed herein. For example, in some embodiments a hammer union accessory (17) may be union pipe (12) configured to be engaged by the hook (24), and the hook (24) may be suitably configured to engage one or more types of union pipe (12) having various features or characteristics. Embodiments accordingly may involve engaging a hammer union accessory (17) with a hook (24), engaging with a hook (24) formed from two parallel spaced-apart plates (15), and engaging union pipe (12) with hook (24).

A hook may be structured to support an item engaged by the hook. In some embodiments, the hook (24) may have a forward support (19) and an opposed support (20), such as where the hook (24) may have an arcuate structure, and one end of the arc may be considered forward and the other opposed.

A forward support (19) and an opposed support (20) may take any suitable configuration consistent with the inventive principles disclosed herein. For example, embodiments may involve, for each of two parallel spaced-apart plates (15), a forward support (19) of a hook (24) and an opposed support (20) of the hook (24) comprising supports formed from the same plate. Embodiments accordingly may involve engaging with a forward support (19) of a hook (24) and an opposed support (20) of the hook (24) formed from the same plate.

Similarly, embodiments may involve, for each of two parallel spaced-apart plates (15), a forward support (19) of a hook (24) comprising a support formed from the plate, and one or more opposed supports (20) of the hook (24) not formed from the two parallel spaced-apart plates (15), such as where the opposed support (20) of the hook (24) may be disposed between the two parallel spaced-apart plates (15) or be disposed at another suitable location or in another suitable configuration. Embodiments accordingly may involve engaging with a forward support (19) of a hook (24) formed from a plate and engaging with an opposed support (20) of the hook (24) not formed from the two parallel spaced-apart plates (15), such as by engaging with an opposed support (20) of the hook (24) disposed between two parallel spaced-apart plates (15).

Regardless of its specific configuration, the hook (24) of course may be configured to support items engaged by the hook (24). For example, in some embodiments it may be desirable that the hook (24) simply have a smooth arcuate profile (21), by which the configuration of the hook (24) in profile may describe a smooth arc. Any suitable configuration consistent with the inventive principles described herein may be utilized to achieve a smooth arcuate profile (21). For example, in various embodiments a hook (24) having at least one forward support (19) and at least one opposed support (20) may describe a smooth arcuate profile (21), regardless of where the supports are specifically positioned on two parallel spaced-part plates (15), between two parallel spaced-apart plates (15), or otherwise. Embodiments accordingly may involve use of a hook (24) in engaging with a smooth arcuate profile (21).

In various embodiments, the accessory lift portion (11) may have a lift axis (25). When the tool is worked to lift a hammer union accessory (17), this generally may be the axis or path along which the lifted item may naturally tend to travel when lifted.

Some embodiments may involve a lift axis (25) that is perpendicular or substantially perpendicular to the lengthwise axis of the elongated grip portion (4). Such an arrangement may be seen to promote ease and efficiency of use of the tool by an operator. For example, where accessory lift portion (11) is a hook (24) and where the hammer union accessory (17) to be lifted is union pipe (12), it may be seen that this arrangement may allow the tool's operator to engage and lift the union pipe (12) in a manner analogous to how one might use a shovel. Embodiments accordingly may involve lifting along an axis substantially perpendicular to the lengthwise axis of elongated grip portion (4).

Some embodiments may involve a lift axis (25) that is displaced from the axis about which torque is applied, such as being inwardly or outwardly displaced. Inward displacement generally may involve being positioned toward the elongated grip portion (4) of the tool and outward displacement generally may involve being positioned away from the elongated grip portion (4) of the tool. Accordingly, where accessory lift portion (11) is a hook (24) and where the hammer union accessory (17) to be lifted is union pipe (12), it may be seen that the hook (24) may be located on the working end (5) displaced to some extent away from the axis about which torque is applied in the direction of the elongated grip portion (4). Such an arrangement may be seen to promote ease and efficiency of use of the tool by an operator, for example by bringing the lift axis closer to the person of the operator. Embodiments accordingly may involve lifting along an axis inwardly displaced from the axis about which torque is applied.

Some embodiments may involve an accessory lift portion (11) located on the working end (5) forward of or substantially forward of the axis about which torque is applied. A forward location generally may involve being positioned in the direction that the operator faces when working the tool. Accordingly, where accessory lift portion (11) is a hook (24) and where the hammer union accessory (17) to be lifted is union pipe (12), it may be seen that the hook (24) may be located on the working end (5) displaced to some extent in front of the axis about which torque is applied. Such an arrangement may be seen to promote ease and efficiency of use of the tool by an operator, for example by enabling lifting to be done at a generally front end of the tool. Embodiments accordingly may involve lifting from a location on working end (5) substantially forward of the axis about which torque is applied.

The accessory lift portion (11) in various embodiments may be made to be capable of lifting a desired load. Where accessory lift portion (11) is a hook (24) and where the hammer union accessory (17) to be lifted is union pipe (12), the hook (24) may be made sufficiently strong to lift union pipe (12) commonly employed in oil and gas industry applications for which the hook (24) is dimensioned.

More generally, in various embodiments, the accessory lift portion (11) may have a load capacity of up to 750 lbs. or even up to 2500 lbs. Where the accessory lift portion (11) is formed from two parallel spaced-apart plates (15), it may be appreciated that the configuration of the plates may reinforce and strengthen the accessory lift portion (11), especially as compared to potentially alternative "strap" or "band" configurations, and may increase the load capacity of the accessory lift portion (11). Similarly, where a spacer (16) is employed between two parallel spaced-apart plates (15), it may be appreciated that the configuration of the spacer (16) may further reinforce and strengthen the accessory lift portion (11), possibly adding even more load capacity to the accessory lift portion (11). For each such spaced-apart plate (15), embodiments also may involve accessory lift portion (11) and arcuate surface portion (6) being formed from the same plate. This also may reinforce and strengthen accessory lift portion (11), and also may add load capacity to the accessory lift portion (11). Embodiments accordingly may involve lifting a load of up to 750 lbs. or even up to 2500 lbs., and for each of two parallel spaced-apart plates (15), lifting using the same plate from which arcuate surface portion (6) is formed.

A hammer union securement tool (1) in various embodiments may have a pivot lever (18). The pivot lever (18) may be on the working end (5) of the tool, and may be formed from two or more parallel spaced-apart plates (15). The pivot lever (18) may provide a point of leverage about which the tool may be pivoted. For example, while an accessory lift portion (11) of the tool may be capable of use without a pivot lever (18), the pivot lever (18) in some embodiments may provide a point of leverage when lifting a hammer union accessory (17) with the accessory lift portion (11). Embodiments accordingly may involve pivoting a working end (5) with a pivot lever (18) of the working end (5).

Various embodiments may involve a pivot lever (18) formed from two parallel spaced-apart plates (15). This may take any suitable configuration of the plates consistent with the inventive principles herein. For example, the pivot lever (18) may include, and in some embodiments may consist of or otherwise be limited to, some or all of two parallel spaced-apart plates (15), while in some embodiments the pivot lever (18) may utilize the two parallel spaced-part plates (15), but may utilize other structures or elements as well. In some embodiments, each plate may be made to have a cut in a shape suitable to provide a point of leverage, such as a point, a bar, a rocker, or the like. The shapes may be made to line up when the plates are disposed in a spaced-apart parallel relation. The pivot lever (18) accordingly may encompass the two point-of-leverage shapes cut out on each plate, as where the two points may rest on a surface to permit the tool to be pivoted about them. Embodiments accordingly may involve pivoting the working end (5) on a pivot lever (18) formed from two parallel spaced-apart plates (15).

In various embodiments, the pivot lever (18) may be separate from the arcuate surface portion (6) and the accessory lift portion (11). This may include occupying a discrete location separated from these portions on working end (5), being configured on working end (5) such that the structure of one of these portions is not utilized in the operation of the other such portion, and the like. Embodiments accordingly may involve pivoting working end (5) on a pivot lever (18) separated from an arcuate surface portion (6) and an accessory lift portion (11).

Some embodiments may involve a pivot lever (18) located on the working end (5) of the tool behind or substantially behind of the axis about which torque is applied. A location that is behind generally may involve being positioned opposite to the direction that the operator faces when working the tool, such as on an end of working end (5) of the tool that is opposite to that where an accessory lift portion (11) may be located. Accordingly, in embodiments where an accessory lift portion (11) is used to lift a hammer union accessory (17), the pivot lever (18) may be located generally at the rear portion of the working end (5) of the tool, behind the axis about which torque is applied, such as where the rear end of the tool's working end (5) may be set on the ground to provide a point of leverage about which the lifting action may be accomplished. Such an arrangement may be seen to promote ease and efficiency of use of the tool by an operator, for example by providing a user-friendly leverage point to assist in lifting items with the tool. Embodiments accordingly may involve pivoting with a pivot lever (18) from behind or substantially behind the axis about which torque is applied.

The pivot lever (18) in various embodiments may be made to be capable of leveraging the lift of a desired load. Where the hammer union accessory (17) to be lifted is union pipe (12), the pivot lever (18) may be made sufficiently strong to provide leverage to lift union pipe (12) commonly employed in oil and gas industry applications.

More generally, in various embodiments, the pivot lever (18) may have a load capacity of up to 750 lbs. or even up to 2500 lbs. Where the pivot lever (18) is formed from two parallel spaced-apart plates (15), it may be appreciated that the configuration of the plates may reinforce and strengthen the pivot lever (18), and may increase its load capacity. Similarly, where a spacer (16) is employed between two parallel spaced-part plates (15), it may be appreciated that the configuration of the spacer may further reinforce and strengthen the pivot lever (18), possibly adding even more load capacity. For each such spaced-apart plate (15), embodiments also may involve pivot lever (18), accessory lift portion (11), and arcuate surface portion (6) being formed from the same plate. This also may reinforce and strengthen pivot lever (18), and also may add to its load capacity. Embodiments accordingly may involve pivoting a load of up to 750 lbs. or even up to 2500 lbs., and for each of two parallel spaced-apart plates (15), pivoting using a pivot lever (18) formed from the same plate from which an accessory lift portion (11) and an arcuate surface portion (6) are formed.

It may be appreciated that the hammer union securement tool (1) may be utilized by one or more persons to accomplish the lifting of hammer union accessories (17) and the securement of hammer unions (2). In some embodiments, for example, the tool may be used by a first tool user to accomplish each of the steps of lifting, mating, receiving, applying, torqueing, and securing with a first hammer union securement tool (1), as these steps may be more fully discussed herein. In other embodiments, for example, two persons using two tools may enable the step of lifting to be accomplished by a first tool user with a first hammer union securement tool (1), and the steps of receiving, applying, torqueing, and securing to be accomplished by a second tool user with a second hammer union securement tool (1), again as each of these steps may be more fully discussed herein.

The hammer union securement tool (1) may be configured and made in any manner consistent with the inventive principles discussed herein. In some exemplary embodiments it may have the following characteristics.

The tool may be made of any suitable material, but embodiments may be made of all or substantially all aluminum. The tool may be manufactured by any suitable process, such as by welding, casting, molding, or the like.

The extension part (14) may be configured as a handle and may be dimensioned as appropriate consistent with the tool's functions and purposes, but in embodiments may be a 36 inch solid aluminum rod, have a diameter of 1½ inches, and may be turned down from 1½ inches to 1 inch in diameter along its length, such as at 18 inches from the bottom to the top (such as similar to a baseball bat), and may have a small nub at the top for grip.

The extension part (14) configured as a handle may attach to the working end (5), such as by sliding into stem part (13) configured as a pipe, such as a 1½ inch ID aluminum pipe, that may be attached, such as by welding, casting, molding, or the like to the working end (5).

The quick-release may be a quick pin that may slide through a hole drilled through both the extension part (14) configured as a handle and the stem part (13) configured as a receiving pipe in order to keep the extension part (14) configured as a handle from sliding out while in use. The quick pin may be a Cotter pin, such as that measures 3 inches in length and slides through a hole drilled in the extension part (14) configured as a handle and stem part (13) configured as a receiving pipe to keep the tool together.

The working end (5) may have two plates (15), such as 2⅜ inch aluminum plates, that may be cut out in the shape of a union diameter, and perhaps may include accessory lift portion (11) as a hook shape at the tip that may complete the lifting task. The two plates (15) may be separated by a suitable gap, such as perhaps by 2 inches, and may be connected with spacer (16) plates, such as 3⅜ inch by 3 inch by 2 inch aluminum plates, that may be welded, cast, molded, or the like to the side plates (15) as separation devices. One of these spacer (16) plates may be welded, cast, molded, or the like at the center top of the two side plates (15), such as to allow the stem part (13) configured as a receiving pipe to be welded, cast, molded, or the like to the working end (5) so that the extension part (14) may be able to slide into place and perhaps be secured with the quick pin. Where the stem part (13) configured as a receiving pipe is welded, cast, molded, or the like to the working end (5) by the spacer (16) plate, two triangular pieces of suitable material, such as aluminum (stanchions) may be welded, cast, molded, or the like to the stem part (13) configured as a receiving pipe and spacer (16) plate, perhaps to strengthen that joint.

The extension part (14) configured as a handle may be quick-release, perhaps giving the operator the ability to use the stem part (13) configured as a receiving pipe (in some embodiments a 6 inch receiving pipe) attached to the working end (5) as a short handle for quick tightening and then attaching the extension part (14) configured as a handle for use as a torque bar (in some embodiments a 36 inch torque bar) to secure a union, such as to industry standards.

The tool may be capable for use for 2 inch to 4 inch unions in one working end (5).

In some embodiments, a hammer union securement tool (1) may weigh not more than about 10 pounds, and in some embodiments perhaps not more than about 7.8 pounds.

In some embodiments, a hammer union securement tool (1) may break up to 6,000 pounds of torque.

In operation, the tool may be used, for example, to lift pipe off of the ground, such as perhaps from 1 inch to 6 inches. Once the pipe is lifted into place, which perhaps may include positioning one end of the pipe to another and starting it through a union, the operator may remove the tool from its lifted position and use the tool to tighten the union, such as to industry standard torque.

It should be noted that all examples discussed herein are provided for illustrative purposes only, and should not be construed to limit the scope of the underlying inventive principles. Moreover, while hammer union technologies are discussed specifically herein throughout, the description of the inventive technology should be understood to include those other methods and apparatus that work on analogously applicable principles, and the scope of the inventive technology should not be construed as limited to just hammer union technologies.

Examples of alternative claims may include:

1. A hammer union securement tool comprising:
    an elongated grip portion;
    a working end to which said elongated grip portion is joined;
    an arcuate surface portion of said working end configured to mate to a complimentary arcuate surface of a hammer union;
    a hammer union lug opening disposed through said arcuate surface portion configured to receive at least one lug of a hammer union;
    a lug torque member of said hammer union lug opening configured to apply torque to said lug of said hammer union;
    an accessory lift portion of said working end configured to lift a hammer union accessory.
2. A hammer union securement tool as described in clause 1 or any other clause wherein said elongated grip portion comprises a stem part and an extension part.
3. A hammer union securement tool as described in clause 2 or any other clause wherein said extension part comprises a removable extension part and further comprising a quick release for said removable extension part.
4. A hammer union securement tool as described in clause 3 or any other clause wherein at least one of said stem part and said extension part are selected from the group consisting of a confined working space stem part, an interchangeable extension part, and a torque maximization length extension part.

5. A hammer union securement tool as described in clause 1 or any other clause wherein said working end comprises an interchangeable working end.
6. A hammer union securement tool as described in clause 1 or any other clause wherein said working end comprises a working end having two spaced-apart plates.
7. A hammer union securement tool as described in clause 6 or any other clause wherein said two spaced-apart plates comprise two parallel spaced-apart plates parallel to each other and parallel to the plane through which torque is applied.
8. A hammer union securement tool as described in clause 7 or any other clause wherein said arcuate surface portion comprises an arcuate surface portion formed from said two parallel spaced-part plates.
9. A hammer union securement tool as described in clause 8 or any other clause wherein said hammer union lug opening comprises a space between said two parallel spaced-apart plates.
10. A hammer union securement tool as described in clause 9 or any other clause wherein said lug torque member comprises a spacer between said two parallel spaced-apart plates.
11. A hammer union securement tool as described in clause 10 or any other clause wherein said spacer comprises a reinforcement element.
12. A hammer union securement tool as described in clause 11 or any other clause wherein said reinforcement element comprises a reinforcement element selected from the group consisting of a working end reinforcement element, a lug torque member reinforcement element, an accessory lift portion reinforcement element, and a pivot lever reinforcement element.
13. A hammer union securement tool as described in clause 7 or any other clause wherein said accessory lift portion comprises an accessory lift portion formed from said two parallel spaced-apart plates and separate from said arcuate surface portion.
14. A hammer union securement tool as described in clause 13 or any other clause wherein said accessory lift portion comprises a hook.
15. A hammer union securement tool as described in clause 14 or any other clause wherein said hook comprises a hook formed from said two parallel spaced-part plates.
16. A hammer union securement tool as described in clause 15 or any other clause wherein, for each of said two parallel spaced-apart plates, a forward support of said hook and an opposed support of said hook comprise supports formed from the same plate.
17. A hammer union securement tool as described in clause 16 or any other clause wherein said forward support of said hook and said opposed support of said hook comprise a smooth arcuate profile.
18. A hammer union securement tool as described in clause 15 or any other clause wherein, for each of said two parallel spaced-apart plates, a forward support of said hook comprises a support formed from said plate, and further comprising an opposed support of said hook not formed from said two parallel spaced-apart plates.
19. A hammer union securement tool as described in clause 18 or any other clause wherein said opposed support of said hook not formed from said two parallel spaced-apart plates comprises an opposed support of said hook disposed between said two parallel spaced-apart plates.
20. A hammer union securement tool as described in clause 19 or any other clause wherein said forward support of said hook and said opposed support of said hook comprise a smooth arcuate profile.
21. A hammer union securement tool as described in clause 14 or any other clause wherein said hammer union accessory comprises union pipe configured to be engaged by said hook.
22. A hammer union securement tool as described in clause 13 or any other clause wherein said accessory lift portion has a lift axis substantially perpendicular to the lengthwise axis of said elongated grip portion.
23. A hammer union securement tool as described in clause 13 or any other clause wherein said accessory lift portion has a lift axis displaced from the axis about which torque is applied.
24. A hammer union securement tool as described in clause 13 or any other clause wherein said accessory lift portion is located on said working end substantially forward of the axis about which torque is applied.
25. A hammer union securement tool as described in clause 13 or any other clause wherein said accessory lift portion has a load capacity selected from the group consisting of up to 750 lbs. and up to 2500 lbs.
26. A hammer union securement tool as described in clause 13 or any other clause wherein, for each of said two parallel spaced-apart plates, said accessory lift portion and said arcuate surface portion comprise an accessory lift portion and an arcuate surface portion formed from the same plate.
27. A hammer union securement tool as described in clause 13 or any other clause further comprising a pivot lever formed from said two parallel spaced-apart plates and separately from said arcuate surface portion and said accessory lift portion.
28. A hammer union securement tool as described in clause 27 or any other clause wherein said pivot lever is located on said working end substantially behind the axis about which torque is applied.
29. A hammer union securement tool as described in clause 27 or any other clause wherein said pivot lever has a load capacity selected from the group consisting of up to 750 lbs. and up to 2500 lbs.
30. A hammer union securement tool as described in clause 27 or any other clause wherein, for each of said two parallel spaced-apart plates, said pivot lever, accessory lift portion and arcuate surface portion comprise a pivot lever, accessory lift portion and arcuate surface portion formed from the same plate.
31. A hammer union securement tool as described in clause 1 or any other clause further comprising a pivot lever of said working end.
32. A method for securing a hammer union comprising the steps of:
 lifting a hammer union accessory with an accessory lift portion of the working end of at least one hammer union securement tool;
 mating an arcuate surface portion of said working end of said at least one hammer union securement tool to a complimentary arcuate surface of a hammer union;
 receiving a lug of a hammer union though a hammer union lug opening disposed through said arcuate surface portion of said at least one hammer union securement tool;
 applying force to an elongated grip portion of said at least one hammer union securement tool to which said working end is joined;

torqueing said lug of said hammer union with a lug torque member of said hammer union lug opening by said application of force to said elongated grip portion;
securing said hammer union by said torqueing of said lug of said hammer union.

33. A method for securing a hammer union as described in clause 32 or any other clause wherein each said step is accomplished by a first tool user with a first hammer union securement tool.

34. A method for securing a hammer union as described in clause 32 or any other clause wherein said step of lifting is accomplished by a first tool user with a first hammer union securement tool and wherein said steps of receiving, applying, torqueing, and securing are accomplished by a second tool user with a second hammer union securement tool.

35. A method for securing a hammer union as described in clause 32 or any other clause wherein said step of applying force comprises the step of applying force to an extension part of said elongated grip portion having an extension part and a stem part.

36. A method for securing a hammer union as described in clause 35 or any other clause further comprising the step of quick-release removing said extension part.

37. A method for securing a hammer union as described in clause 36 or any other clause wherein said step of applying force comprises the step of applying force selected from the group consisting of applying force to a stem part in a confined working space, applying force to an interchanged extension part, and applying force along an extension part having a length selected to maximize torque.

38. A method for securing a hammer union as described in clause 32 or any other clause further comprising the step of interchanging said working end.

39. A method for securing a hammer union as described in clause 32 or any other clause wherein said steps of lifting, mating, receiving, applying, torqueing, and securing comprise the step of utilizing two spaced-apart plates of said working end.

40. A method for securing a hammer union as described in clause 39 or any other clause wherein said step of utilizing two spaced-apart plates comprises the step of utilizing two parallel spaced-apart plates parallel to each other and parallel to the plane through which torque is applied.

41. A method for securing a hammer union as described in clause 40 or any other clause wherein said step of mating comprises the step of mating said arcuate surface portion formed from said two parallel spaced-apart plates.

42. A method for securing a hammer union as described in clause 41 or any other clause wherein said step of receiving comprises the step of receiving through a space between said two parallel spaced-apart plates.

43. A method for securing a hammer union as described in clause 42 or any other clause wherein said step of torqueing comprises the step of torqueing with a spacer between said two parallel spaced-apart plates.

44. A method for securing a hammer union as described in clause 43 or any other clause wherein said step of torqueing with a spacer comprises the step of reinforcing with said spacer.

45. A method for securing a hammer union as described in clause 44 or any other clause wherein said step of reinforcing comprises the step of reinforcing selected from the group consisting of reinforcing said working end with said spacer, reinforcing said lug torque member with said spacer, reinforcing said accessory lift portion with said spacer, and reinforcing a pivot lever with said spacer.

46. A method for securing a hammer union as described in clause 40 or any other clause wherein said step of lifting comprises the step of lifting with said accessory lift portion formed from said two parallel spaced-apart plates and separated from said arcuate surface portion.

47. A method for securing a hammer union as described in clause 46 or any other clause wherein said step of lifting comprises the step of engaging a hammer union accessory with a hook.

48. A method for securing a hammer union as described in clause 47 or any other clause wherein said step of engaging comprises the step of engaging with a hook formed from said two parallel spaced-part plates.

49. A method for securing a hammer union as described in clause 48 or any other clause wherein, for each of said two parallel spaced-apart plates, said step of engaging with a hook formed from said two parallel spaced-apart plates comprises the step of engaging with a forward support of said hook and an opposed support of said hook formed from the same plate.

50. A method for securing a hammer union as described in clause 49 or any other clause wherein said step of engaging with a forward support of said hook and an opposed support of said hook formed from the same plate comprises the step of engaging with a smooth arcuate profile.

51. A method for securing a hammer union as described in clause 48 or any other clause wherein, for each of said two parallel spaced-apart plates, said step of engaging comprises the step of engaging with a forward support of said hook formed from said plate, and further comprising the step of engaging with an opposed support of said hook not formed from said two parallel spaced-part plates.

52. A method for securing a hammer union as described in clause 51 or any other clause wherein said step of engaging with an opposed support of said hook not formed from said two parallel spaced-part plates comprises the step of engaging with an opposed support of said hook disposed between said two parallel spaced-apart plates.

53. A method for securing a hammer union as described in clause 52 or any other clause wherein said step of engaging comprises the step of engaging with a smooth arcuate profile.

54. A method for securing a hammer union as described in clause 48 or any other clause wherein said step of engaging comprises the step of engaging union pipe with a hook.

55. A method for securing a hammer union as described in clause 46 or any other clause wherein said step of lifting comprises the step of lifting along an axis substantially perpendicular to the lengthwise axis of said elongated grip portion.

56. A method for securing a hammer union as described in clause 46 or any other clause wherein said step of lifting comprises the step of lifting along an axis displaced from the axis about which torque is applied.

57. A method for securing a hammer union as described in clause 46 or any other clause wherein said step of lifting comprises the step of lifting from a location on said working end substantially forward of the axis about which torque is applied.

58. A method for securing a hammer union as described in clause 46 or any other clause wherein said step of lifting comprises a step selected from the group consisting of lifting a load of up to 750 lbs. and lifting a load of up to 2500 lbs.

59. A method for securing a hammer union as described in clause 46 or any other clause wherein, for each of said two parallel spaced-apart plates, said step of lifting comprises the step of lifting using the same plate from which said arcuate surface portion is formed.
60. A method for securing a hammer union as described in clause 46 or any other clause further comprising the step of pivoting said working end on a pivot lever formed from said two parallel spaced-apart plates and separated from said arcuate surface portion and said accessory lift portion.
61. A method for securing a hammer union as described in clause 60 or any other clause wherein said step of pivoting comprises the step of pivoting with said pivot lever from substantially behind the axis about which torque is applied.
62. A method for securing a hammer union as described in clause 60 or any other clause wherein said step of pivoting comprises a step selected from the group consisting of pivoting a load of up to 750 lbs. and pivoting a load of up to 2500 lbs.
63. A method for securing a hammer union as described in clause 60 or any other clause wherein, for each of said two parallel spaced-apart plates, said step of pivoting comprises the step of pivoting using said pivot lever formed from the same plate from which said accessory lift portion and said arcuate surface portion are formed.
64. A method for securing a hammer union as described in clause 32 or any other clause further comprising the step of pivoting said working end with a pivot lever of said working end.
65. A system substantially as herein described with reference to any one or more of the Figures and Description.
66. The process according to clause 32 or any other clause and further comprising any of the steps as shown in FIGS. 1-18, separately, in any combination or permutation.

As may be easily understood from the foregoing, the basic concepts of the present inventive technology may be embodied in a variety of ways. It involves both hammer union securement and accessory lift techniques as well as devices to accomplish the appropriate hammer union securement and accessory lift. In this application, the hammer union securement and accessory lift techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "lift" or "securement" should be understood to encompass disclosure of the act of "lifting" or "securing"—whether explicitly discussed or not—and, conversely, were there effectively disclosure of the act of "lifting" or "securing," such a disclosure should be understood to encompass disclosure of a "lift" or "securement" and even a "means for lifting" or a "means for securing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below and in the list of References To Be Incorporated By Reference or other information statement filed with the application are hereby appended and hereby incorporated by reference, however, as to each of the above, to the extent that such information or statements incorporated by reference might be considered inconsistent with the patenting of this/these inventive technology(s) such statements are expressly not to be considered as made by the applicant(s).

LIST OF REFERENCES TO BE
INCORPORATED HEREIN BY REFERENCE

I. US Patents

| Patent No. | Kind Code | Issue Date | Patentee |
| --- | --- | --- | --- |
| 0183344 | A | 1876-10-00 | Taber |
| 0455606 | A | 1891-07-00 | Byrne |
| 0579748 | A | 1897-03-00 | Haley |
| 0804008 | A | 1905-11-00 | Hopkins |
| 1207046 | A | 1916-12-00 | Howard |
| 1527772 | A | 1922-02-00 | Baird |
| 1608432 | A | 1926-11-00 | Ryan |
| 1627435 | A | 1927-05-00 | Hooben |
| 1709075 | A | 1929-04-00 | Howard |
| 1763353 | A | 1930-06-00 | Heller |
| 1945406 | A | 1934-01-00 | Adams |
| 2360163 | A | 1944-10-00 | Sadler |
| 2420458 | A | 1947-05-00 | Barker |
| 2539262 | | 1951-01-00 | Moore |
| 2986054 | | 1961-05-00 | Lurie |
| 4013313 | | 1977-03-00 | Gardels |
| 4597123 | | 1986-07-01 | Cobe |
| 4644600 | | 1987-02-00 | Fugate et al. |
| 4713991 | | 1987-12-00 | Gaug |
| 4960014 | | 1991-10-00 | Kelley |
| 5791704 | | 1998-08-00 | Thompson et al. |
| 2503364 | | 1950-04-11 | Viets |
| 2599668 | | 1952-06-10 | C. R. Taylor |
| 2691912 | | 1954-10-19 | Jones |
| 3604106 | | 1971-09-14 | Borries |
| 4483220 | | 1984-11-20 | Shindelar |
| D2812750 | | 1983-11-08 | Richilano |
| 4646378 | | 1987-03-00 | Borden |
| 4715252 | | 1987-12-00 | Pella |
| D650644 | | 2011-12-00 | Dosch et al. |
| D650645 | | 2011-12-00 | Dosch et al. |
| 3929152 | | 1975-12-00 | Graham |
| 3769863 | | 1973-11-00 | Griffin |
| 3222958 | | 1995-10-00 | Houdesheldt |
| 5456278 | | 1995-10-00 | Morris et al. |
| 5440956 | | 1995-08-00 | Johnstun |
| 5205193 | | 1993-04-00 | Wield |
| 2736954 | | 1956-03-00 | Palmer |
| 1006348 | | 1911-10-00 | Beran |
| D694078 | | 2013-11-26 | Dumaine et al. |
| 9186780 | B2 | 2015-11-17 | Dumaine et al. |

II. US Patent Application Publications

| Publication No. | Kind Code | Publication Date | Patentee |
| --- | --- | --- | --- |
| 20040025649 | | 2004-02-00 | Rugee |
| 20050183550 | | 2005-08-00 | Day |
| 20050279193 | | 2005-12-00 | Darby et al. |
| 20060075855 | | 2006-04-00 | Fitzpatrick |
| 20100005934 | | 2010-01-00 | Guilbault |
| 20120048069 | | 2012-03-01 | Powell Jr. |
| 20040055427 | | 2004-03-25 | Stier |
| 20020104410 | | 2002-08-08 | Wang |
| 20040206213 | | 2004-10-21 | Chih-Ching Hsien |
| 20120048069 | | 2012-03-01 | Powell Jr. |
| 20050217877 | | 2005-10-00 | Neal et al. |
| 20100050824 | | 2010-03-00 | Vollenwider |
| 20140138836 | A1 | 2014-09-18 | Dumaine |
| 20140260822 | | 2014-09-18 | Dumaine et al. |
| 20140260821 | | 2014-09-18 | Dumaine et al. |
| 2014260822 | A1 | 2015-10-29 | Dumaine et al. |

III. Foreign Patent Documents

| Foreign Document No. | Country Code | Publication Date | Name of Patentee |
| --- | --- | --- | --- |
| 2010083577 | WO | 2010-07-29 | Lopes |
| 202004010688 | DE | 2004-10-14 | Streit Heinz |
| 202004010688 | DE | 2014-10-14 | Streit |
| 2012048069 | US | 2012-03-01 | Powell |
| 2014138836 | WO | 2014-09-08 | Huwe Inc. |
| 2013382549 | AU | 2015-09-17 | Huwe Inc. |
| 105246651 | CN | 2016-01-13 | Huwe Inc. |
| 2953766 | EP | 2015-12-16 | Huwe Inc. |
| 12015502064 | PH | 2016-01-25 | Huwe Inc. |
| 11201507387V | SG | 2015-10-29 | Huwe Inc. |
| 2810346 | CA | 2016-06-21 | Huwe Inc. |
| 2810357 | CA | 2014-09-13 | Huwe Inc. |

IV. Non-Patent Literature Documents http://www.huwewrench.com/(c) 2013-2014.
HUWE information pamphlet on the Revolutionary Hammer Union Wrench (c) 2013-2014, 2 pages.
U.S. Provisional Pat. application Ser. No. 62/212,479; filed Aug. 31, 2015. First Named Inventor: Bernard P. Hunt.

Thus, the applicant(s) should be understood to have support to claim and make a statement of invention to at least: i) each of the hammer union securement and accessory lift devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A hammer union securement tool comprising:
   an elongated grip portion defining a longitudinal axis;
   a working end to which said elongated grip portion is joined, said working end comprising two parallel spaced-apart plates;
   an arcuate surface portion of of each of said parallel spaced-apart plates, the arcuate surface portions being complimentary to an arcuate surface of a hammer union;
   a hammer union lug opening within a space between the two parallel spaced-apart plates and configured to receive a lug of a hammer union;
   at least one lug torque member disposed within of said hammer union lug opening, said at least one of lug torque member connected between the two parallel spaced-apart plates, the at least one lug torque member being configured to apply torque to said lug of said hammer union;
   an accessory lift portion of said working end configured to lift a hammer union accessory, wherein said accessory lift portion comprises a hook formed by each of said two parallel spaced-apart plates, said hook extending in a direction substantially perpendicular to said longitudinal axis and separate from said arcuate surface portion.

2. A hammer union securement tool as described in claim 1 wherein said elongated grip portion comprises a stem part and an extension part.

3. A hammer union securement tool as described in claim 2 wherein said extension part comprises a removable extension part and further comprising a quick release for said removable extension part.

4. A hammer union securement tool as described in claim 3 wherein at least one of said stem part and said extension part are selected from the group consisting of a confined working space stem part, an interchangeable extension part, and a torque maximization length extension part.

5. A hammer union securement tool as described in claim 1 wherein said working end comprises an interchangeable working end.

6. A hammer union securement tool as described in claim 1 wherein said lug torque member comprises a spacer.

7. A hammer union securement tool as described in claim 6 wherein said spacer comprises a reinforcement element.

8. A hammer union securement tool as described in claim 1 wherein, for each of said two parallel spaced-apart plates, a forward support of said hook and an opposed support of said hook comprise supports formed from the same plate.

9. A hammer union securement tool as described in claim 8 wherein said forward support of said hook and said opposed support of said hook comprise a smooth arcuate profile.

10. A hammer union securement tool as described in claim 1 wherein, for each of said two parallel spaced-apart plates, a forward support of said hook comprises a support formed from said spaced-apart plate, and further comprising an opposed support of said hook not formed from said two parallel spaced-apart plates.

11. A hammer union securement tool as described in claim 10 wherein said opposed support of said hook not formed from said two parallel spaced-apart plates comprises an opposed support of said hook disposed between said two parallel spaced-apart plates.

12. A hammer union securement tool as described in claim 11 wherein said forward support of said hook and said opposed support of said hook comprise a smooth arcuate profile.

13. A hammer union securement tool as described in claim 1 wherein said hammer union accessory comprises union pipe configured to be engaged by said hook.

14. A hammer union securement tool as described in claim 1 wherein said accessory lift portion has a lift axis substantially perpendicular to the longitudinal axis of said elongated grip portion.

15. A hammer union securement tool as described in claim 1 wherein said accessory lift portion has a lift axis displaced from the axis about which torque is applied.

16. A hammer union securement tool as described in claim 1 wherein said accessory lift portion is located on said working end substantially forward of the axis about which torque is applied.

17. A hammer union securement tool as described in claim 1 wherein said accessory lift portion has a load capacity selected from the group consisting of up to 750 lbs. and up to 2500 lbs.

18. A hammer union securement tool as described in claim 1 wherein, for each of said two parallel spaced-apart plates, said accessory lift portion and said arcuate surface portion comprise an accessory lift portion and an arcuate surface portion formed from the same spaced-apart plate.

19. A hammer union securement tool as described in claim 1 further comprising a pivot lever formed by each of said two parallel spaced-apart plates and disposed substantially opposite the accessory lift portion.

20. A hammer union securement tool as described in claim 19 wherein said pivot lever is located on said working end substantially behind the axis about which torque is applied.

21. A hammer union securement tool as described in claim 19 wherein said pivot lever has a load capacity selected from the group consisting of up to 750 lbs. and up to 2500 lbs.

22. A hammer union securement tool as described in claim wherein, for each of said two parallel spaced-apart plates, said pivot lever, accessory lift portion and arcuate surface portion comprise a pivot lever, accessory lift portion and arcuate surface portion formed from the same spaced-apart plate.

* * * * *